United States Patent
Yuasa

(10) Patent No.: US 9,779,481 B2
(45) Date of Patent: Oct. 3, 2017

(54) DEVICE AND PROGRAM FOR CONTROLLING DIRECTION OF DISPLAYED IMAGE

(71) Applicant: NTT DOCOMO, INC., Tokyo (JP)

(72) Inventor: Tomotaka Yuasa, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/419,535

(22) PCT Filed: Jul. 10, 2013

(86) PCT No.: PCT/JP2013/068884
§ 371 (c)(1),
(2) Date: Feb. 4, 2015

(87) PCT Pub. No.: WO2014/030455
PCT Pub. Date: Feb. 27, 2014

(65) Prior Publication Data
US 2015/0193912 A1    Jul. 9, 2015

(30) Foreign Application Priority Data

Aug. 24, 2012 (JP) .................................. 2012-185225

(51) Int. Cl.
*G06T 3/60* (2006.01)
*G06F 3/041* (2006.01)
(Continued)

(52) U.S. Cl.
CPC .............. *G06T 3/60* (2013.01); *G06F 1/1694* (2013.01); *G06F 3/041* (2013.01);
(Continued)

(58) Field of Classification Search
CPC ... G06F 2203/04808; G06F 2203/0488; G06F 2200/1614; G06F 1/1626; G06F 3/041;
(Continued)

(56) References Cited

U.S. PATENT DOCUMENTS

2009/0002391 A1\* 1/2009 Williamson .......... G06F 1/1626
345/659
2009/0184935 A1\* 7/2009 Kim ..................... G06F 3/0488
345/173
(Continued)

FOREIGN PATENT DOCUMENTS

CN       102012739 A     4/2011
EP         2118730 A2   11/2009
(Continued)

OTHER PUBLICATIONS

Notice of Reasons for Refusal for Japanese Patent Application No. 2014-531544, dated Jul. 28, 2015.
(Continued)

*Primary Examiner* — Chante Harrison
(74) *Attorney, Agent, or Firm* — MKG, LLC

(57) ABSTRACT

Mobile terminal device has a display rotation function for rotating a direction of an image on a screen so that the downward direction of the image fits the vertical downward direction in the real world. While no touch of a finger of a user is detected, the display rotation function remains on, and when a touch of the user is detected, the display rotation function is turned off. When the user does not wish to use the display rotation function, the user can temporarily turn off the display rotation function simply by maintaining his/her finger in contact with the screen, and when the user wishes to use the display rotation function, the user can turn on the display rotation function simply by releasing his/her finger from the screen.

2 Claims, 15 Drawing Sheets

(51) Int. Cl.
*G06F 3/14* (2006.01)
*G06F 1/16* (2006.01)
*G06F 3/0488* (2013.01)

(52) U.S. Cl.
CPC ........... *G06F 3/04883* (2013.01); *G06F 3/14* (2013.01); *G06F 2200/1614* (2013.01); *G06F 2200/1637* (2013.01); *G09G 2340/0492* (2013.01); *G09G 2340/14* (2013.01); *G09G 2354/00* (2013.01)

(58) Field of Classification Search
CPC .... G06F 3/14; G06F 3/04998; G06F 1/16265; G09G 2340/135; G09G 2340/0492; G09G 5/00; G09G 5/36; G09G 2340/14; G09G 2354/00; G09G 2340/13; G06G 2200/1637; G06T 3/60
USPC .................. 345/649, 659; 715/863, 864
See application file for complete search history.

(56) References Cited

U.S. PATENT DOCUMENTS

| | | | |
|---|---|---|---|
| 2010/0240415 A1* | 9/2010 | Kim | G06F 3/03547 455/565 |
| 2011/0057880 A1 | 3/2011 | Kasahara | |
| 2011/0057903 A1* | 3/2011 | Yamano | G06F 3/0237 345/174 |
| 2011/0169868 A1* | 7/2011 | Amemiya | G06F 1/1626 345/676 |
| 2012/0116550 A1* | 5/2012 | Hoffman | A63B 24/0084 700/91 |
| 2012/0133678 A1* | 5/2012 | Kim | G06F 3/0488 345/649 |
| 2012/0139944 A1* | 6/2012 | Kuriya | G06F 3/038 345/649 |
| 2012/0154294 A1* | 6/2012 | Hinckley | G06F 1/1649 345/173 |
| 2012/0194421 A1* | 8/2012 | Son | G06F 3/165 345/156 |
| 2012/0299964 A1* | 11/2012 | Homma | G06F 1/1694 345/649 |
| 2013/0053107 A1* | 2/2013 | Kang | G06F 3/04883 455/566 |
| 2013/0120256 A1* | 5/2013 | Ishidera | G09G 3/20 345/158 |
| 2013/0239058 A1* | 9/2013 | Yao | G06F 3/04847 715/833 |
| 2013/0293502 A1 | 11/2013 | Kitatani | |
| 2013/0328935 A1* | 12/2013 | Tu | G06F 1/1694 345/651 |
| 2013/0342483 A1* | 12/2013 | Seo | G06F 3/0488 345/173 |
| 2014/0123003 A1* | 5/2014 | Song | G06F 1/1626 715/701 |
| 2015/0116232 A1* | 4/2015 | Hayakawa | G06F 3/041 345/173 |

FOREIGN PATENT DOCUMENTS

| | | |
|---|---|---|
| EP | 2293176 A2 | 7/2010 |
| JP | 2003216135 | 7/2003 |
| JP | 5189197 B | 2/2013 |
| JP | 2013054334 | 3/2013 |
| JP | 5189197 B1 | 4/2013 |
| JP | 2013069297 | 4/2013 |
| JP | 2013097400 | 5/2013 |
| JP | 2013097400 A | 5/2013 |
| WO | 2008085741 A2 | 7/2008 |
| WO | 2011008603 A1 | 1/2011 |
| WO | 2012114592 A | 8/2012 |
| WO | 2013022000 A1 | 2/2013 |

OTHER PUBLICATIONS

PCT International Search Report issued in International Application No. PCT/JP2013/068884, dated Sep. 24, 2013, pp. 1-2.
Partial European Search Report for European Patent Application No. 13831050.3-1904/ 2889737 PCT/JP2013068884, dated Feb. 3, 2016.
Extended European Search Report issued in corresponding European Application No. 13831050.3 dated Jul. 21, 2016, pp. 1-14.
Office Action issued in corresponding Chinese Patent Application No. 201380024179.8, dated Oct. 20, 2016, pp. 1-8.
Office Action issued in corresponding European Patent Application No. 13 831 050.3, dated Feb. 13, 2017, pp. 1-7.
Summons to Attend Oral Proceedings issued by the European Patent Office for corresponding European Patent Application No. 13831050.3, dated Jul. 18, 2017, pp. 1-13.
Second Office Action issued in corresponding Chinese Patent Application No. 201380024179.8, dated Jun. 23, 2017, pp. 1-8 (English Translation pp. 1-11).

* cited by examiner

DEVICE AND PROGRAM FOR CONTROLLING DIRECTION OF DISPLAYED IMAGE

TECHNICAL FIELD

This invention relates to a technique for controlling direction of image displayed by a device in response to inclination of the device.

BACKGROUND

There is known in the art a mobile terminal device having a function of automatically changing a direction of an image displayed on a screen of the mobile terminal device in response to inclination of the mobile terminal device. (Hereinafter, this function is referred to as a "display rotation function.")

FIG. 1 shows how an image is displayed by mobile terminal device 9 having the display rotation function known in the art. The downward direction in FIG. 1 corresponds to a vertical downward direction in the real world. In the following explanation, a state of mobile terminal device 9 with a long side of its rectangular shaped screen extending in a vertical direction as shown in FIG. 1(a) is referred to as a "vertically long state," and a state of mobile terminal device 9 with a short side of its screen extending in a vertical direction as shown in FIG. 1(b) is referred to as a "horizontally long state." Moreover, in the following explanation, a position or a direction of a screen is specified by a combination of an x-coordinate and a y-coordinate in a coordination system in which the origin is the left lower apex of the screen in the vertically long state; the positive direction of a y-axis is the upward direction in the vertically long state; and the positive direction of an x-axis is the rightward direction in the vertically long state.

When the display rotation function is in operation, as shown in FIGS. 1(a) and 1(b), mobile terminal device 9 displays an image in a state where the vertical direction of a content of an image fits the vertical direction of the real world in both the vertically long state and the horizontally long state. Namely, when mobile terminal device 9 is in the vertically long state as shown in FIG. 1(a), mobile terminal device 9 displays the image so that the vertical direction of the content of the image fits the y-axis, and when mobile terminal device 9 is in the horizontally long state as shown in FIG. 1(b), mobile terminal device 9 displays the image so that the vertical direction of the content of the image fits the x-axis. Accordingly, when mobile terminal device 9 is rotated, for example, in a counterclockwise direction by 90 degrees and the state of mobile terminal device 9 changes from the vertically long state as shown in FIG. 1(a) to the horizontally long state as shown in FIG. 1(b), mobile terminal device 9 rotates the displayed image on the screen in a clockwise direction by 90 degrees.

A user of mobile terminal device 9 having the display rotation function is able to see the image on the screen as an upright image both when the user holds mobile terminal device 9 in the vertically long state and when the user holds mobile terminal device 9 in the horizontally long state.

JP2003-216135A is a document that discloses a technique of adjusting a direction of an image displayed on a screen in response to an inclination of a mobile terminal device. In the information display device disclosed in JP2003-216135A, a degree of inclination of the information displaying device is determined, and when information including both text and figures is displayed on the screen of the device, for example, only text is rotated in response to a determined degree of inclination of the device, thereby to display the text as an upright image.

In a mobile terminal device with the known display rotation function, a direction of a displayed image may not always fit a viewing direction that a user of the mobile terminal device wishes to use. (In this application, an "image" shown on a screen may contain any sort of information such as figures, text, symbols, and so on.) For example, when the user holds the mobile terminal device in a state where a screen of the mobile terminal device is generally parallel with a horizontal plane, a direction of an image displayed on the screen of the mobile terminal device may, contrary to the user's intention, be rotated by the display rotation function in response to a small change in inclination along the x-axis direction or the y-axis direction. For example, when the user is lying on the floor and views the screen of the mobile terminal device, since the horizontal direction becomes an upright direction of the image for the user, the image displayed by the terminal device rotated by the display rotation function becomes prone from a view point of the user and thus cannot be viewed with comfort by the user.

SUMMARY

To solve the above-explained problem, the user is required to carry out an operation to stop the display rotation function. Some mobile terminal devices according to the prior art have a hardware manipulandum for stopping the display rotation function, and the user is able to start and stop the display rotation function by carrying out operations by use of the hardware manipulandum. Also known in the art are mobile terminal devices that display a virtual manipulandum for stopping a display rotation function, and a user can start and stop the display rotation function by carrying out operations by use of the virtual manipulandum, such as a touch operation.

The above-mentioned operations required to be carried out in relation to the manipulandum for starting and stopping a display rotation function may not be satisfactory for the user. For example, when the user wishes to allow another person to view an image displayed on the screen of the mobile terminal for a short time only, amounting to several seconds or several tens of seconds, the user normally would keep holding the mobile terminal device and change a direction of the mobile terminal device so that the other person is able to view the image comfortably. If the display rotation function is operating when the user changes a direction of the mobile terminal device, the direction of the image on the screen may change to an unintended direction. The user can avoid such an unintentional change of direction of the image by stopping the display rotation function, but an operation required to be carried out in relation to the manipulandum for stopping the display rotation function for such a short time only may be inconvenient for the user.

In view of the foregoing, it is an object of the present invention to provide a user of a mobile terminal device with a way for turning on and off the display rotation function more easily than can be accomplished in the prior art.

In an aspect of the present invention, there is provided a device comprising: a display unit that displays an image on a screen, a touch detection unit that detects a touch or a proximity of a pointer with the screen, an inclination detection unit that detects an inclination of the screen from a reference direction, and a control unit that determines a direction of the image on the screen, wherein the control unit determines whether a direction of the image on the screen should be changed in response to a detection of an inclination of the screen by the inclination detection unit on the basis of whether a first condition that the touch detection unit currently detects one or more touches of one or more pointers on the screen or one or more proximities to the screen of one or more pointers is met.

In one preferred embodiment, the first condition requires that the touch detection unit currently detects one or more touches of one or more pointers on the screen or one or more proximities to the screen, the control unit does not execute the change of direction of the image on the screen as long as the first condition is met regardless of a degree of inclination of the screen currently detected by the inclination detection unit, and the control unit executes the change of direction of the image on the screen as long as the first condition is not met in response to a degree of inclination of the screen currently detected by the inclination detection unit.

In another preferred embodiment, the touch detection unit determines an index value indicating a level of pressing force of one or more touches of one or more pointers on the screen, and the first condition requires that the index value that is currently determined by the touch detection unit indicates a level of pressing force that is equal to or greater than a predetermined threshold value.

In another preferred embodiment, the touch detection unit determines a position of a touch of a pointer on the screen or a proximity to the screen of the pointer, and the first condition requires that one or more positions of one or more touches of one or more pointers on the screen or one or more proximities to the screen of one or more pointers currently determined by the touch detection unit are within a predetermined area of the screen.

In another aspect of the present invention, there is provided a device comprising: a display unit that displays an image on a screen, a touch detection unit that detects a touch of a pointer on the screen or a proximity to the screen of the pointer, and when one or more touches of one or more pointers are detected, determines an index value indicating a level of pressing force of the detected touches, an inclination detection unit that detects an inclination of the screen from a reference direction, and a control unit that determines a direction of the image on the screen, wherein in a first mode, the control unit determines whether a direction of the image on the screen should be changed in response to a detection of an inclination of the screen by the inclination detection unit on the basis of whether a first condition that the touch detection unit currently detects one or more touches of one or more pointers on the screen or one or more proximities to the screen of one or more pointers is met, in a second mode, the control unit does not execute the change of direction of the image on the screen, and while the control unit is in the first mode, when the control unit determines an index value indicating a level of pressing force that is equal to or greater than a predetermined threshold value, the control unit switches to the second mode.

In one preferred embodiment, the first condition requires that the touch detection unit currently detects one or more touches of one or more pointers on the screen or one or more proximities to the screen of one or more pointers, while the control unit is in the first mode, the control unit does not execute the change of direction of the image on the screen as long as the first condition is met regardless of a degree of inclination of the screen that is currently detected by the inclination detection unit, and while the control unit is in the first mode, the control unit executes the change of direction of the image on the screen as long as the first condition is not met in response to a degree of inclination of the screen currently detected by the inclination detection unit.

In another preferred embodiment, the touch detection unit detects a touch of a pointer on the screen or a proximity to the screen of the pointer, and while the control unit is in the second mode, when the control unit determines a moving position of one or more touches indicating a slide of one or more pointers in a predetermined area on the screen, the control unit switches to the first mode.

In another aspect of the present invention, there is provided a program that causes a computer comprising a display unit that displays an image on a screen, a touch detection unit that detects a touch of a pointer on the screen or a proximity to the screen of the pointer, and an inclination detection unit that detects an inclination of the screen from a reference direction to execute: determination of whether a direction of the image on the screen should be changed in response to a detection of an inclination of the screen by the inclination detection unit on the basis of whether a first condition that the touch detection unit currently detects one or more touches of one or more pointers on the screen or one or more proximities to the screen of one or more pointers is met.

In another aspect of the present invention, there is provided a program that causes a computer comprising a display unit that displays an image on a screen, a touch detection unit that detects a touch of a pointer on the screen or a proximity to the screen of the pointer, and when one or more touches of one or more pointers are detected, determines an index value indicating a level of pressing force of the detected touch, and an inclination detection unit that detects an inclination of the screen from a reference direction to execute: in a first mode, determining whether a direction of the image on the screen should be changed in response to a detection of an inclination of the screen by the inclination detection unit on the basis of whether a first condition that the touch detection unit currently detects one or more touches or one or more proximities of one or more pointers is met, in a second mode, preventing the display unit from changing a direction of the image on the screen, and while the control unit is in the first mode, when the control unit determines an index value indicating a level of pressing force that is equal to or greater than a predetermined threshold value, switches to the second mode.

According to the present invention, a user can turn on and turn off a display rotation function of a mobile terminal device in a simple manner as compared to a mobile terminal device according to the prior art.

BRIEF DESCRIPTION OF THE DRAWINGS

FIG. 13(a)-13(e) show how an image is displayed by a mobile terminal device according to a fourth exemplary embodiment of the present invention.

FIG. 13(f)-13(h) show how an image is displayed by the mobile terminal device according to the fourth exemplary embodiment of the present invention.

DETAILED DESCRIPTION

[First Exemplary Embodiment]

Figure 1:
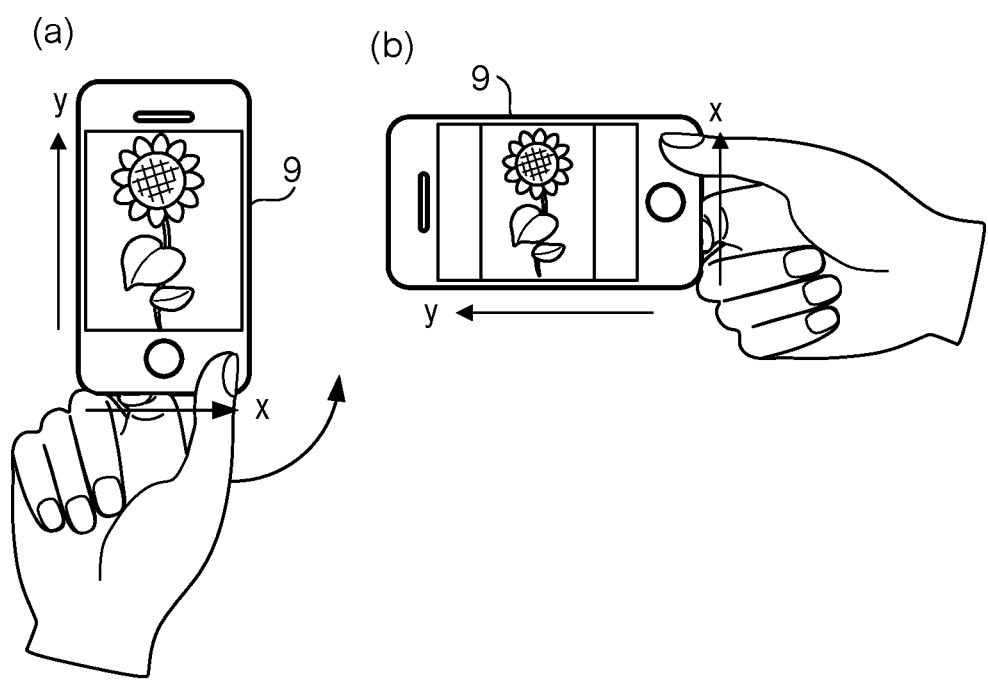
FIGS. 1(a) and 1(b) show how an image is displayed by a mobile terminal device having a display rotation function according to the prior art.

Explanation will now be provided with reference to the Figs. as to how a display rotation function of mobile terminal device 1 according to a first exemplary embodiment of the present invention is turned on and off. While there is no touch of a finger of a user on the screen of mobile terminal device 1 the display rotation function remains turned on, and operates in the same way as mobile terminal device 9 according to the prior art explained above with reference to FIG. 1. Namely, mobile terminal device 1 displays an image so that a downward direction of the image fits the vertical downward direction in the real world by rotating the direction of the image on the screen by 90 degrees in a direction opposite to a direction of rotation of mobile terminal device 1 when rotation of mobile terminal 1 is detected.

On the other hand, when one or more fingers of the user touch the screen of mobile terminal device 1, the display rotation function remains turned off, and a direction of the image on the screen is maintained as long as one or more fingers of the user touch the screen, and a change in direction of the screen is not made.

Figure 2:
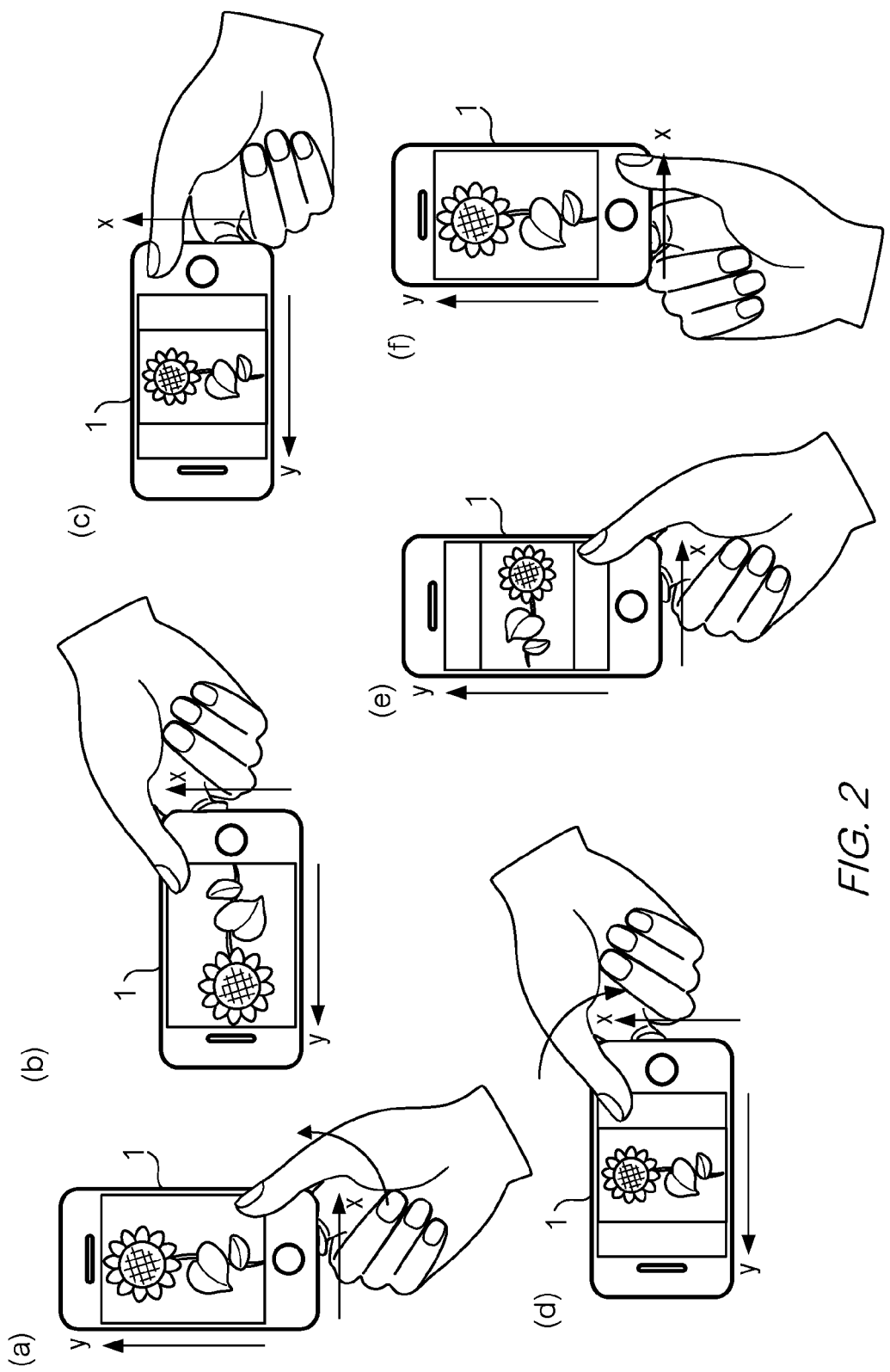
FIGS. 2(a)-2(f) show how an image is displayed by a mobile terminal device according to a first exemplary embodiment of the present invention.

FIG. 2 shows how an image is displayed by mobile terminal device 1 when a finger of the user touches the screen. As shown in FIG. 2(a), when the user's finger touches the screen of mobile terminal device 1 in the vertically long state, the display rotation function is turned off, and the direction of the image on the screen is locked with the upward direction of the image extending in the y-axis positive direction of the screen. If the user rotates mobile terminal device 1 in a counterclockwise direction until mobile terminal device 1 is in the horizontally long state as shown in FIG. 2(b) by keeping his/her finger in contact with the screen, the direction of the image on the screen is not changed, since the display rotation function is turned off, and the image is displayed in a prone position.

When mobile terminal device 1 is in the state shown in FIG. 2(b), if the user releases his/her finger from the screen, the display rotation function is turned on in mobile terminal device 1. Accordingly, in this case, in mobile terminal device 1 the direction of the image on the screen is changed so that the downward direction of the image extends in the vertical downward direction of the real world, i.e. in the x-axis positive direction of the screen, as shown in FIG. 2(c).

When mobile terminal device 1 is in the horizontally long state with the y-axis positive direction of the screen extending in the leftward direction as shown in FIG. 2(d), if the user's finger touches the screen, the display rotation function is turned off, and the direction of the image on the screen is locked with the upward direction of the image extending in the x-axis positive direction of the screen. If the user rotates mobile terminal device 1 in a clockwise direction until mobile terminal device 1 is in the vertically long state as shown in FIG. 2(e) while his/her finger is touching the screen, the direction of the image on the screen does not change, since the display rotation function is turned off, and the image is displayed in a prone position.

When mobile terminal device 1 is in the state shown in FIG. 2(e), if the user releases his/her finger from the screen, the display rotation function is turned on in mobile terminal device 1. In this case, the direction of the image on the screen in mobile terminal device 1 is changed so that the downward direction of the image extends in the vertical downward direction in the real world, i.e. in the y-axis positive direction of the screen, as shown in FIG. 2(f).

As explained above, according to mobile terminal device 1, a user can temporarily turn off the display rotation function simply by maintaining in contact with the screen one or more of his/her fingers, and the user can turn on the display rotation function simply by releasing his/her finger(s) from the screen. An operation by the user to maintain in contact with the screen his/her finger(s) to temporarily turn off the display rotation function hereinafter is referred to as "hold," and an operation of the user to release his/her finger(s) from the screen to turn on the display rotation function hereinafter is referred to as "release of hold." Hold for keeping the display rotation function turned off and release of hold for turning on the display rotation function are perceived by the user intuitively as virtual operations, with one or more of his her fingers being used to maintain a position of an image on the screen.

Figure 3:
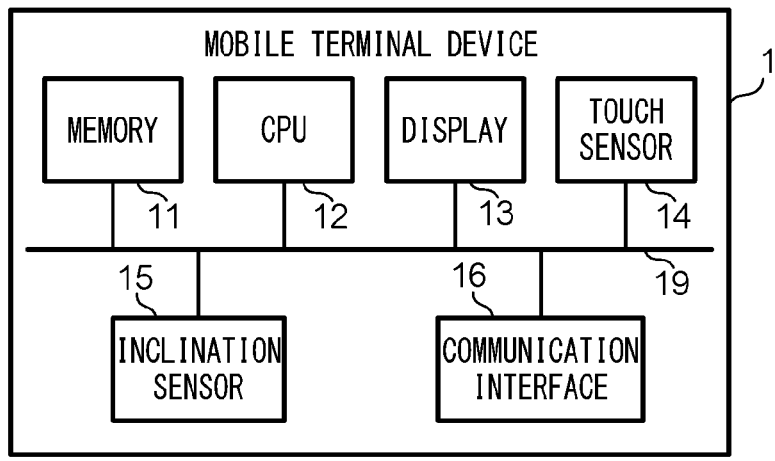
FIG. 3 shows a block diagram of a hardware configuration of the mobile terminal device according to the first exemplary embodiment of the present invention.

A configuration of mobile terminal device 1 in accordance with the above will now be explained. FIG. 3 shows a simplified block diagram of a hardware configuration of mobile terminal device 1. The hardware configuration of mobile terminal device 1 is the same as a hardware configuration of a general computer having a touch-screen and a sensor for determining a degree of inclination of the computer. Namely, mobile terminal device 1 has, as elements of its hardware configuration, memory 11, Central Processing Unit (CPU) 12, display 13, touch sensor 14, inclination sensor 15, and communication interface 16.

These elements are connected with each other via data bus 19. Memory 11 may contain, for example, one or more of Random Access Memory (RAM), Read Only Memory (ROM), Solid State Drive (SSD), etc., and stores data. CPU 12 executes data processing and controls the elements of mobile terminal device 1 other than CPU 12. Display 13 may contain a liquid crystal display, etc., and displays images. Touch sensor 14 may contain a capacitive touch sensor, etc., and detects each touch of one or more of a user's fingers on a screen of display 13. Inclination sensor 15 may contain a triaxial accelerometer, etc., and determines an inclination of mobile terminal device 1 from a certain direction such as the vertical downward direction. Communication interface 16 is an interface for communicating data sets with other devices wirelessly or by wire.

Display 13 and touch sensor 14 constitute a touch-screen, and when the user uses his/her finger(s) to touch the screen on which an image is displayed, touch sensor 14 determines sets of coordinates in an area where one or more of the user's fingers touches the screen, and outputs the sets of coordinates. Hereinafter, an area of a screen which a user touches with one or more of his/her fingers is referred to as a "touch area." CPU 12 determines, for example, a center of gravity and a dimension of a touch area based on sets of coordinates output from touch sensor 14. A center of gravity of a touch area is used to determine a point of contact of one or more of the user's fingers with the screen. A dimension of a touch area is used for an index of strength of a pressing force of one or more fingers against the screen.

Inclination sensor 15 outputs an inclination data set indicating degrees of the x-axis, y-axis, and z-axis of the screen of display 13 from the vertical downward direction. The z-axis of the screen is orthogonal to both of the x-axis and y-axis, and extends from the screen to the user.

Figure 4:
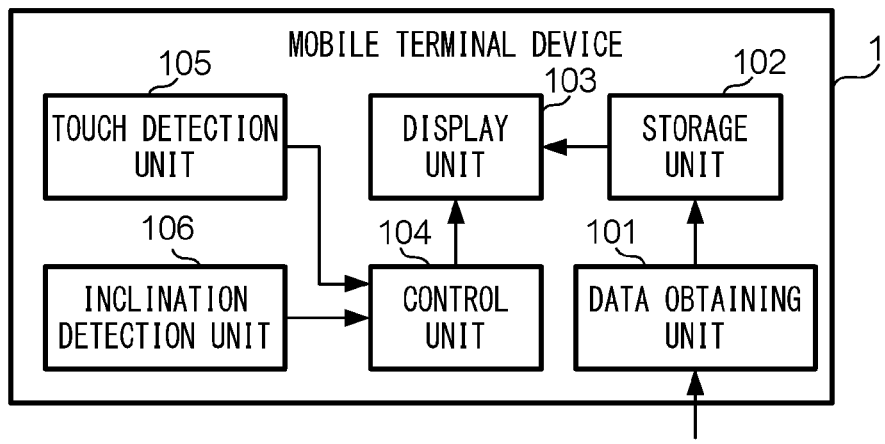
FIG. 4 shows a block diagram of a functional configuration of the mobile terminal device according to the first exemplary embodiment of the present invention.

Mobile terminal device 1 having the hardware configuration shown in FIG. 3 operates as a device having the functional configuration shown in FIG. 4 when mobile terminal device 1 executes processing following instructions of a program stored in memory 11 according to this exemplary embodiment. Mobile terminal device 1 has, as elements of its functional configuration, data obtaining unit 101 that obtains image data sets or data sets used for generating image data sets from another device; storage unit 102 that stores data sets obtained by data obtaining unit 101; display unit 103 that displays images indicated by image data sets; control unit 104 that instructs display unit 103 to display images and controls the elements of functional configuration of mobile terminal device 1 other than control unit 104; touch detection unit 105 that detects each touch of one or more fingers of the user on the screen of display unit 103 on which images are displayed; and inclination detection unit 106 that determines inclinations of mobile terminal device 1 from the vertical downward direction. In the following explanation, a position and a direction on the screen of mobile terminal device 1 are specified by use of the same coordinate system used for the screen of mobile terminal device 9 explained in the background section.

Figure 5:
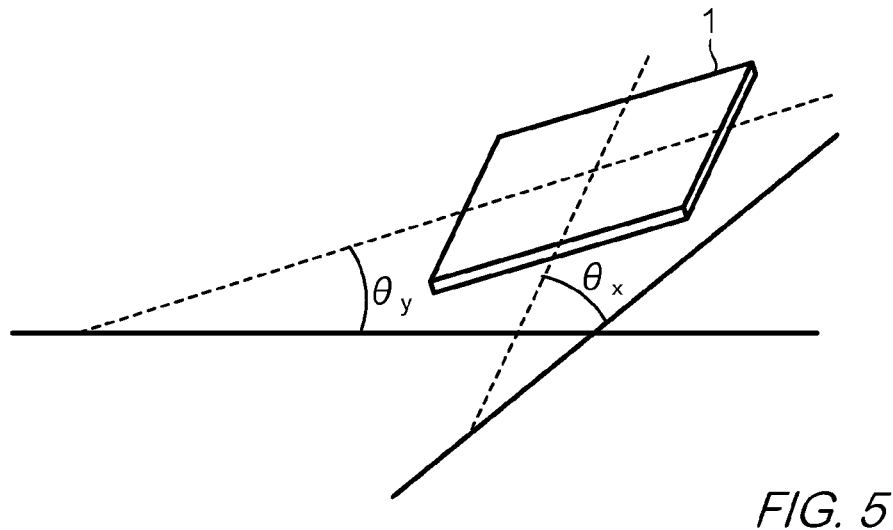
FIG. 5 shows samples of angles of elevation in directions of an x-axis and a y-axis determined by an inclination detection unit according to the first exemplary embodiment of the present invention.

Inclination detection unit 106 determines a degree of an angle of the x-axis direction of display unit 103 from the horizontal plane (referred to as an "x-axis elevation angle $\theta x$" hereinafter), and a degree of an angle of the y-axis direction of display unit 103 from the horizontal plane (referred to as a "y-axis elevation angle $\theta y$" hereinafter). FIG. 5 shows an x-axis elevation angle $\theta x$ and a y-axis elevation angle $\theta y$, on the basis of an inclination data set output from inclination sensor 15.

Figure 6:
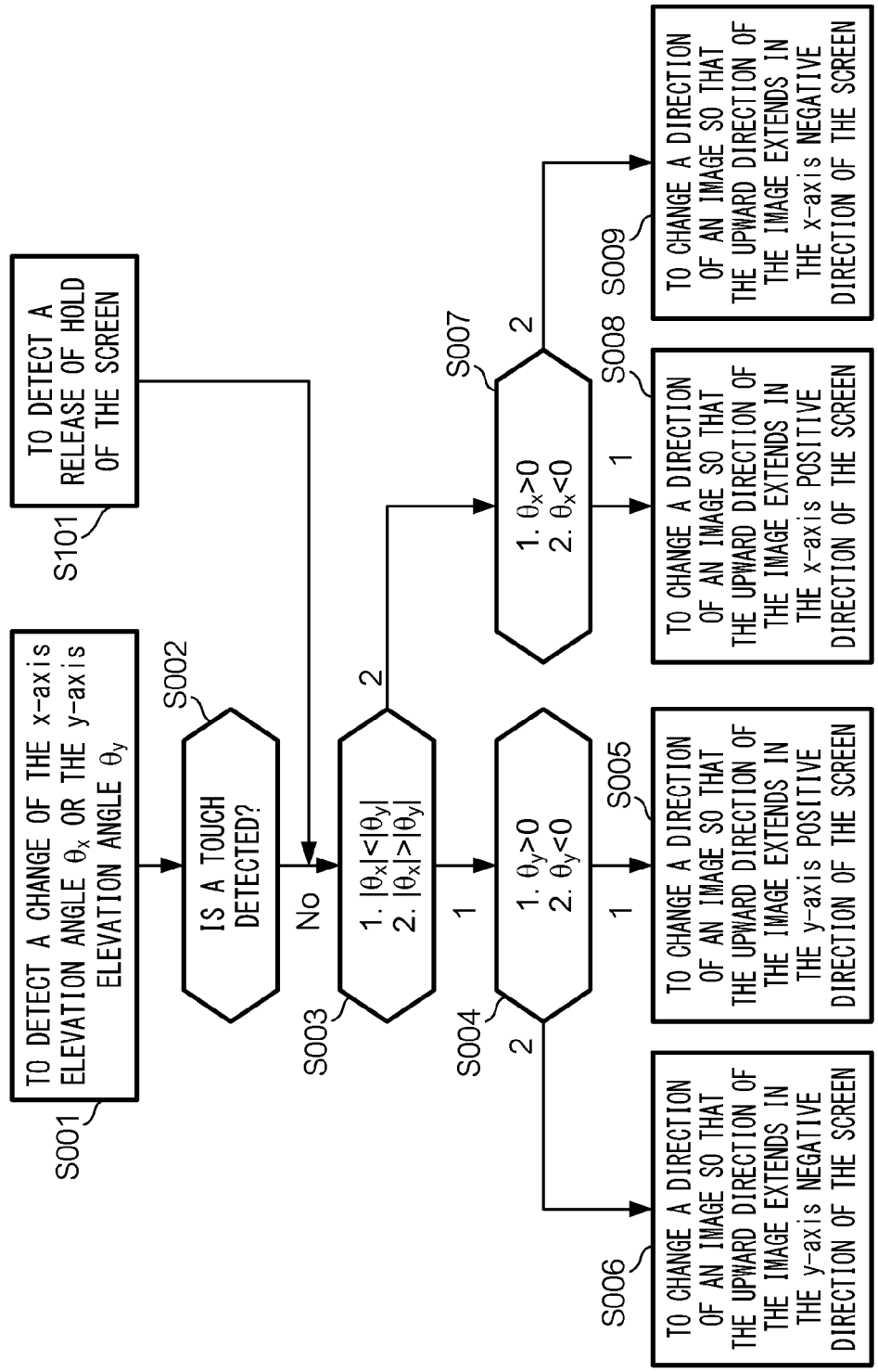
FIG. 6 shows a flow of processes executed by a control unit of the mobile terminal device according to the first exemplary embodiment of the present invention.

Control unit 104 instructs display unit 103 in which direction an image should be displayed on the screen in accordance with whether a touch is detected by touch detection unit 105, and in accordance with an x-axis elevation angle $\theta x$ and a y-axis elevation angle $\theta y$ that are determined by inclination detection unit 106. FIG. 6 shows a series of processes that control unit 104 executes for instructing display unit 103 in which direction an image should be displayed.

Control unit 104 monitors the x-axis elevation angle $\theta x$ and the y-axis elevation angle $\theta y$ that are updated by inclination detection unit 106 regularly at short periods of time (for example, 0.1 seconds), and when control unit 104 detects a change of at least one of the x-axis elevation angle $\theta x$ and the y-axis elevation angle $\theta y$ (step S001), control unit 104 judges whether contact is detected by touch detection unit 105 at the same time (step S002).

When control unit 104 judges that contact is detected by touch detection unit 105 in the judgment of step S002, control unit 104 does not instruct display unit 103 to change a direction of the image. As a result, a direction of the image on the screen is maintained. On the other hand, when control unit 104 judges that contact is not detected by touch detection unit 105 in the judgment of step S002 (step S002; "No"), control unit 104 compares absolute values of the x-axis elevation angle $\theta x$ and the y-axis elevation angle $\theta y$ (step S003).

When control unit 104 judges that the absolute values of x-axis elevation angle $\theta x$ and y-axis elevation angle $\theta y$ are the same, control unit 104 does not instruct display unit 103 to change a direction of an image. As a result, a direction of an image on the screen is maintained. On the other hand, when control unit 104 judges that the absolute value of y-axis elevation angle $\theta y$ is larger than the absolute value of x-axis elevation angle $\theta x$ (step S003; "1"), control unit 104 judges whether the y-axis elevation angle $\theta y$ is positive or negative (step S004). When the y-axis elevation angle $\theta y$ is positive (step S004; "1"), control unit 104 instructs display unit 103 to change a direction of image so that the upward direction of the image extends in the y-axis positive direction of the screen (step S005). When the y-axis elevation angle $\theta y$ is negative (step S004; "2"), control unit 104 instructs display unit 103 to change a direction of the image so that the upward direction of the image extends in the y-axis negative direction of the screen (step S006). As a result, the vertical direction of image fits the y-axis direction, and the image can be viewed by the user as an upright image.

When control unit 104 judges that the absolute value of x-axis elevation angle $\theta x$ is larger than the absolute value of y-axis elevation angle $\theta y$ (step S003; "2"), control unit 104 judges whether the x-axis elevation angle $\theta x$ is positive or negative (step S007). When the x-axis elevation angle $\theta x$ is positive (step S007; "1"), control unit 104 instructs display unit 103 to change a direction of image so that the upward direction of the image extends in the x-axis positive direction of the screen (step S008). When the x-axis elevation angle $\theta x$ is negative (step S007; "2"), control unit 104 instructs display unit 103 to change a direction of the image so that the upward direction of the image extends in the x-axis negative direction of the screen (step S009). As a result, the vertical direction of the image fits the x-axis direction, and the image can be viewed by the user as an upright image.

As explained above, control unit 104 monitors the x-axis elevation angle $\theta x$ and the y-axis elevation angle $\theta y$. In addition, control unit 104 also monitors whether contact is detected by touch detection unit 105 (step S101). When a contact state detected by touch detection unit 105 changes from a state where a touch is detected to a state where a touch is not detected, namely, when a release of hold is detected (step S101), control unit 104 executes a series of processes from step S003 to step S009 explained above. As a result, in response to a release of hold, a direction of the image on the screen is changed according to a direction of mobile terminal device 1 at a time such that the downward direction of the image extends in the vertical downward direction in the real world.

Display unit 103 displays an image by changing the direction of the image on the screen in accordance with instructions provided by control unit 104, as explained above. As a result, while one or more fingers of the user touch the screen, the display rotation function is turned off, and a direction of the image on the screen at a time when one or more touch is newly detected is maintained. On the other hand, when none of one or more of the user's fingers touches the screen, the display rotation function is turned on, and a direction of the image on the screen is changed in response to a change of direction of mobile terminal device 1 so that the downward direction of the image extends in the vertical downward direction of the real world.

[Second Exemplary Embodiment]

Mobile terminal device 2 according to a second exemplary embodiment of the present invention is explained below. Some parts of configuration of mobile terminal device 2 and processes executed by mobile terminal device 2 are the same as those of mobile terminal 1, and mainly parts of the configuration and processes of mobile terminal device 2 that are different from those of mobile terminal device 1 are explained below. In the following explanation, elements of mobile terminal device 2 in common with mobile terminal device 1 are denoted by like reference numerals.

According to mobile terminal device 1, the display rotation function is turned off while one or more fingers of the user touch the screen regardless of a strength of the touch. According to mobile terminal device 2, the display rotation function is turned off only when a user touches one or more of his/her fingers against the screen with a strength that is equal to or more than a predetermined value. Namely, according to mobile terminal device 2, while the screen is touched by one or more fingers of the user with a strength that is less than the predetermined value, the display rotation function is turned on in addition to when the screen is not touched by a finger of the user.

Figure 7:
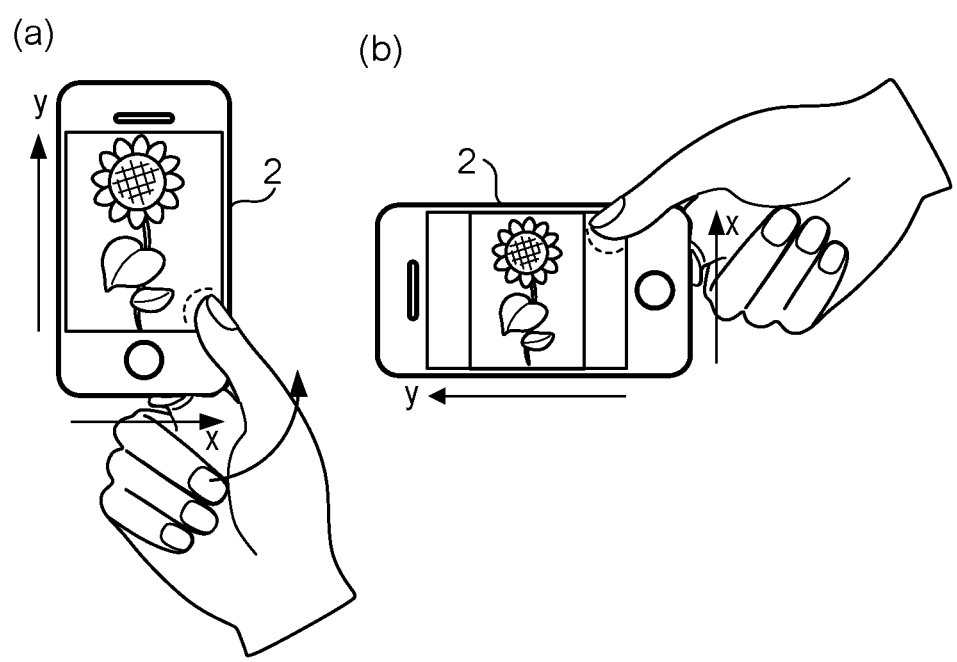
FIGS. 7(a) and 7(b) show how an image is displayed by a mobile terminal device according to a second exemplary embodiment of the present invention.
Figure 8:
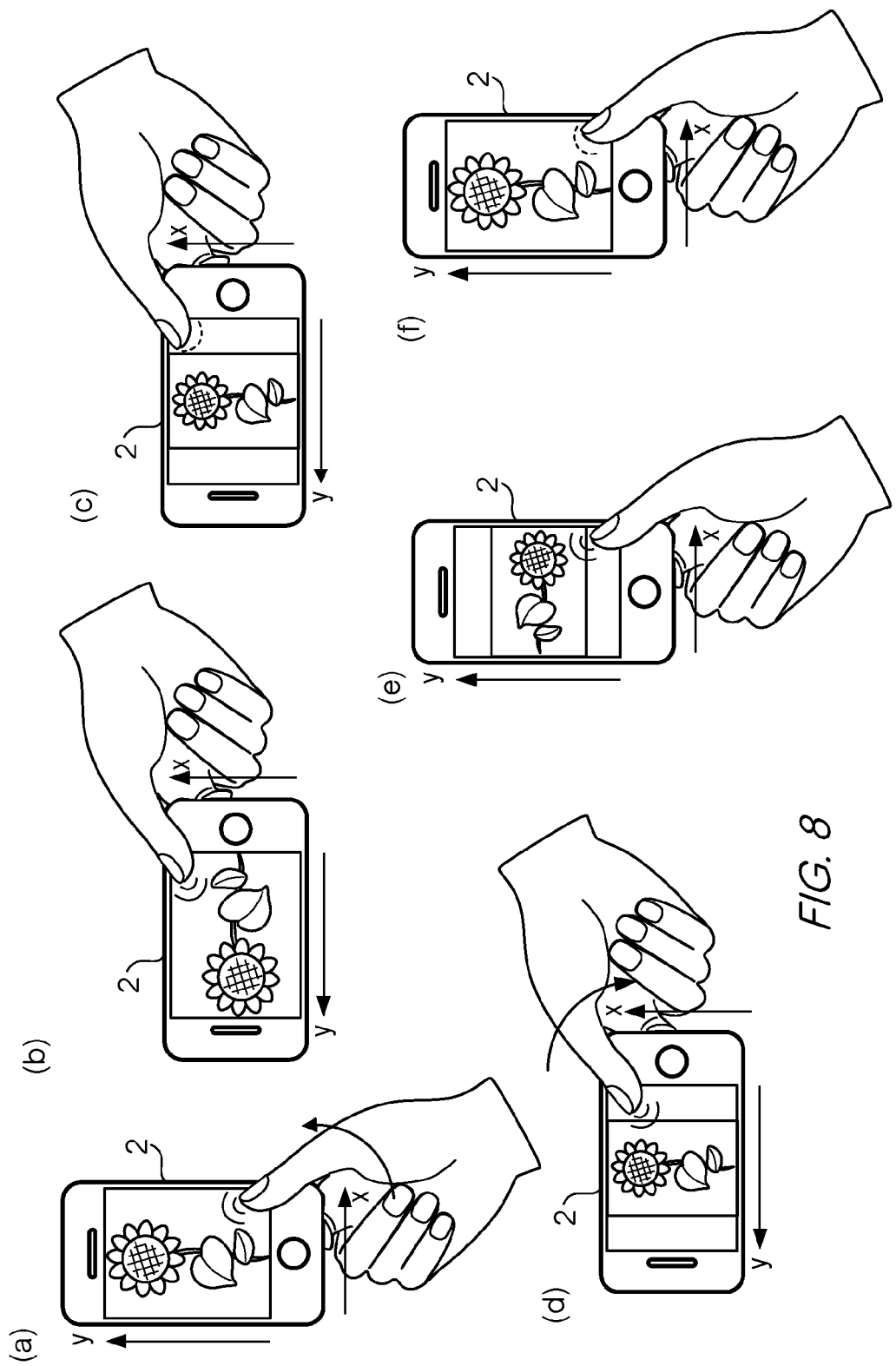
FIG. 8(a)-8(f) show how an image is displayed by the mobile terminal device according to the second exemplary embodiment of the present invention.

FIG. 7 and FIG. 8 show how an image is displayed by mobile terminal device 2. FIG. 7 shows how a direction of an image displayed on mobile terminal device 2 is changed when a user changes a direction of mobile terminal device 2 while touching the screen of the device consistently with a strength that is normally used. In this case, the display rotation function remains turned on, and a direction of the image is changed in response to a change of direction of mobile terminal device 2 so that the downward direction of the image extends in the vertical downward direction in the real world.

FIG. 8 shows how the direction of an image displayed by mobile terminal device 2 is changed when the user changes a direction of mobile terminal device 2 while touching the screen with one or more of his/her fingers at different strengths. FIG. 8(a) shows a situation where the user touches the screen with a finger at a strength that is greater than that normally used by the user. Because the strength of touch is greater than normal, the display rotation function is turned off. FIG. 8(b) shows a situation where the user rotates mobile terminal device 2 in an anticlockwise direction while touching the screen with a finger at a strength greater than that normal. In this situation, the direction of an image on the screen is maintained as it is. FIG. 8(c) shows a situation where the user decreases a strength of touch of his/her finger on the screen, at a strength that is normal. In this situation, the display rotation function is turned on, and the direction of an image on the screen is changed so that the downward direction of the image extends in the vertical downward direction in the real world.

FIG. 8(d) shows a situation where the user increases a strength of touch of his/her finger on the screen following the situation shown in FIG. 8(c). In response to the increase in strength of touch, the display rotation function is turned off, and the direction of an image on the screen is maintained as it is as shown in FIG. 8(d). FIG. 8(e) shows a situation where the user rotates mobile terminal device 2 in clockwise direction while maintaining a strength of contact with the screen following the situation shown in FIG. 8(d). Namely, the direction of an image on the screen is maintained as it is. FIG. 8(f) shows a situation where the user decreases a strength of contact of his/her finger with the screen to a normal strength following the situation shown in FIG. 8(e). In this situation, the display rotation function is turned on, and the direction of an image is maintained so that the downward direction of the image extends in the vertical downward direction in the real world.

As explained above, according to mobile terminal device 2, the user can turn off the display rotation function by touching the screen with a strength that is stronger than a strength that is normally used, and turn on by decreasing the strength of the touch on the screen. The operation of touching the screen more strongly than normal for maintaining the display rotation function turned off and the operation of decreasing a strength of touch on the screen for turning on the display rotation function are intuitively understood by the user as virtual operations for touching the image on the screen with a strong pressure with one or more of his/her fingers.

A hardware configuration of mobile terminal device 2 that operates as explained above is the same as the hardware configuration of mobile terminal device 1 (FIG. 3), and a functional configuration of mobile terminal device 2 is the same as the functional configuration of mobile terminal device 1 (FIG. 4). However, control unit 104 of mobile terminal device 2 determines whether the display rotation function should be turned on or off on the basis of a strength of touch, i.e. whether a strength of touch of one or more fingers against the screen is equal to or greater than a predetermined threshold value or less than the threshold value. Accordingly, touch detection unit 105 of mobile terminal device 2 determines, in addition to a touch, an index value indicating a strength of a pressing force of one or more fingers used for touching the screen, and provides control unit 104 with the determined index value.

An index value determined by touch detection unit 105 of mobile terminal device 2 that indicates a strength of pressing force is, for example, a dimension of a touch area determined by CPU 12 based on sets of coordinates output from touch sensor 14. Touch sensor 14 does not measure a strength of a pressing force of one or more fingers used for a touch detected by touch sensor 14. However, the greater a strength of a pressing force of one or more fingers against the screen of display 13 is, the larger a dimension of a touch area is. Accordingly, mobile terminal device 2 measures a dimension of a touch area of one or more fingers (such as a thumb) of the user that touches the screen with normal strength, and stores the measured dimension of the touch area as a reference dimension in storage unit 102 in advance. Then, when a dimension of touch area determined by touch detection unit 105 is equal to or greater than a threshold value determined by multiplying the reference dimension by a predetermined coefficient (for example "1.2"), control unit 104 maintains the display rotation function turned off.

Figure 9:
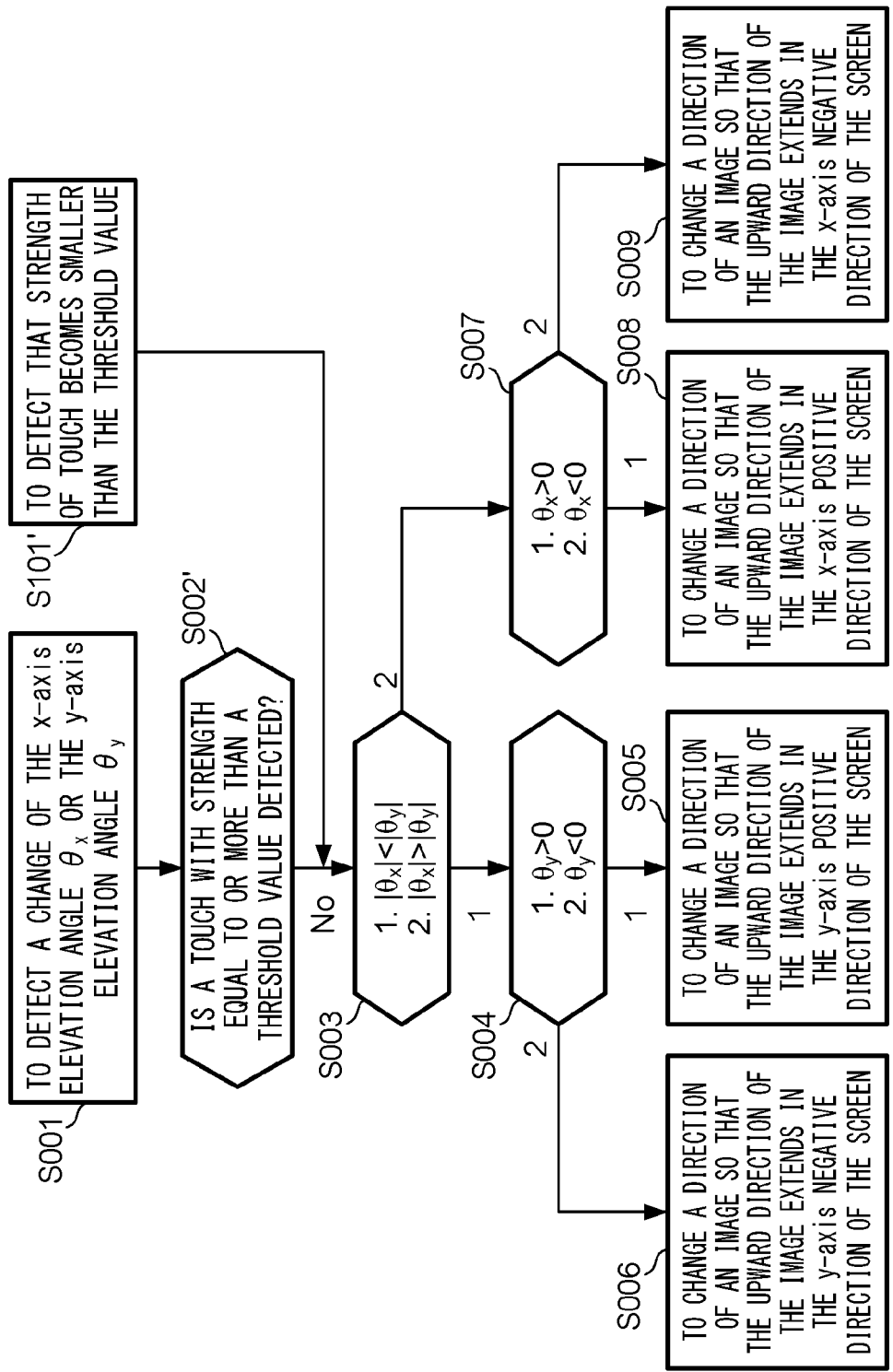
FIG. 9 shows a flow of processes executed by a control unit of the mobile terminal device according to the second exemplary embodiment of the present invention.

FIG. 9 shows a flow of processes that control unit 104 of mobile terminal device 2 executes for instructing display unit 103 directions in which an image should be displayed. The processes shown in FIG. 9 are the same as the processes executed by control unit 104 of mobile terminal device 1 as shown in FIG. 6 except that step S002 and step S101 are replaced by step S002' and step S101' explained below.

When control unit 104 detects a change of at least one of the x-axis elevation angle θx and the y-axis elevation angle θy (step S001), control unit 104 judges whether a strength of touch that is detected by touch detection unit 105 at the time is equal to or more than a predetermined threshold strength or not by checking whether a dimension of a touch area determined by touch detection unit 105 is equal to or more than the threshold value determined by multiplying the reference dimension by the predetermined coefficient (step S002').

When control unit 104 judges that a touch with a strength that is equal to or greater than the predetermined threshold strength is detected by touch detection unit 105 in the judgment of step S002', control unit 104 does not instruct display unit 103 to change a direction of an image. A direction of an image on the screen is maintained as it is even if the user changes a direction of mobile terminal device 2 as long as the user touches the screen of mobile terminal device 2 with a pressing force that is greater than a normal pressing force.

On the other hand, when control unit 104 judges that a touch with a strength that is equal to or greater than the predetermined threshold strength is not detected by touch detection unit 105 in the judgment of step S002' (step S002'; "No"), control unit 104 executes a series of processes of step S003 to step S009. As a result, when the user changes a direction of mobile terminal device 2 in a state where the user maintains a touch on the screen with a normal strength, a direction of an image on the screen is changed in response to the change of direction of mobile terminal device 2 so that the downward direction of the image extends in the vertical downward direction in the real world.

Moreover, control unit 104 monitors the dimension of touch area determined by touch detection unit 105, i.e. strength of touch on the screen. When the dimension of touch area determined by touch detection unit 105 changes from a value that is equal to or more than the threshold value determined by multiplying the reference dimension by the predetermined coefficient to a value that is less than the threshold value, i.e. when control unit 104 detects that a pressing force of one or more fingers on the screen becomes less than the threshold strength (step S101'), control unit 104 also executes a series of processes from step S003 to step S009 explained above. When the user decreases a pressing force from a strength that is greater than the normal strength to a normal strength, a direction of image on the screen is changed according to a direction of mobile terminal device 2 at the time so that the downward direction of the image extends in the vertical downward direction in the real world.

Display unit 103 displays an image by changing a direction of an image on the screen following instructions provided by control unit 104 as explained above. As the result, while the screen is touched strongly by one or more fingers of the user, the display rotation function is turned off, and a direction of the image on the screen at the time when the strong touch starts and is maintained. On the other hand, while the screen is touched with a normal strength or the screen is not touched by any of one or more the user's fingers, the display rotation function is turned on, and a direction of an image on the screen is changed in response to a change of direction of mobile terminal device 2 so that the downward direction of the image extends in the vertical downward direction in the real world.

[Third Exemplary Embodiment]

Mobile terminal device 3 according to a third exemplary embodiment of the present invention is explained below. Some parts of the configuration of mobile terminal device 3 and processes executed by mobile terminal device 3 are the same as those of mobile terminal 1, and mainly parts of the configuration and processes of mobile terminal device 3 that are different from those of mobile terminal device 1 are explained below. In the following explanation, elements of mobile terminal device 3 in common with mobile terminal device 1 are denoted by like reference numerals.

According to mobile terminal device 1, the display rotation function is turned off while one or more fingers of the user touch the screen regardless of a position of touch on the screen. According to mobile terminal device 3, the display rotation function is turned off only when a user touches one or more of his/her fingers against the screen in a predetermined area of the screen. Namely, according to mobile terminal device 3, while the screen is touched by one or more fingers of the user outside the predetermined area, the display rotation function is turned on in addition to when the screen in not touched by any of one or fingers of the user.

Figure 10:
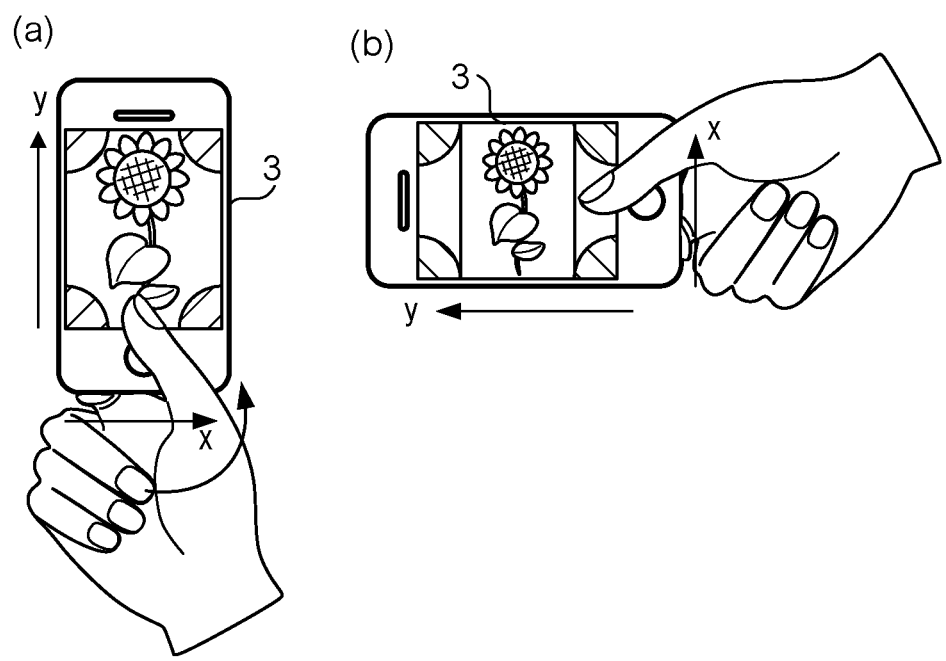
FIGS. 10(a) and 10(b) show how an image is displayed by a mobile terminal device according to a third exemplary embodiment of the present invention.
Figure 11:
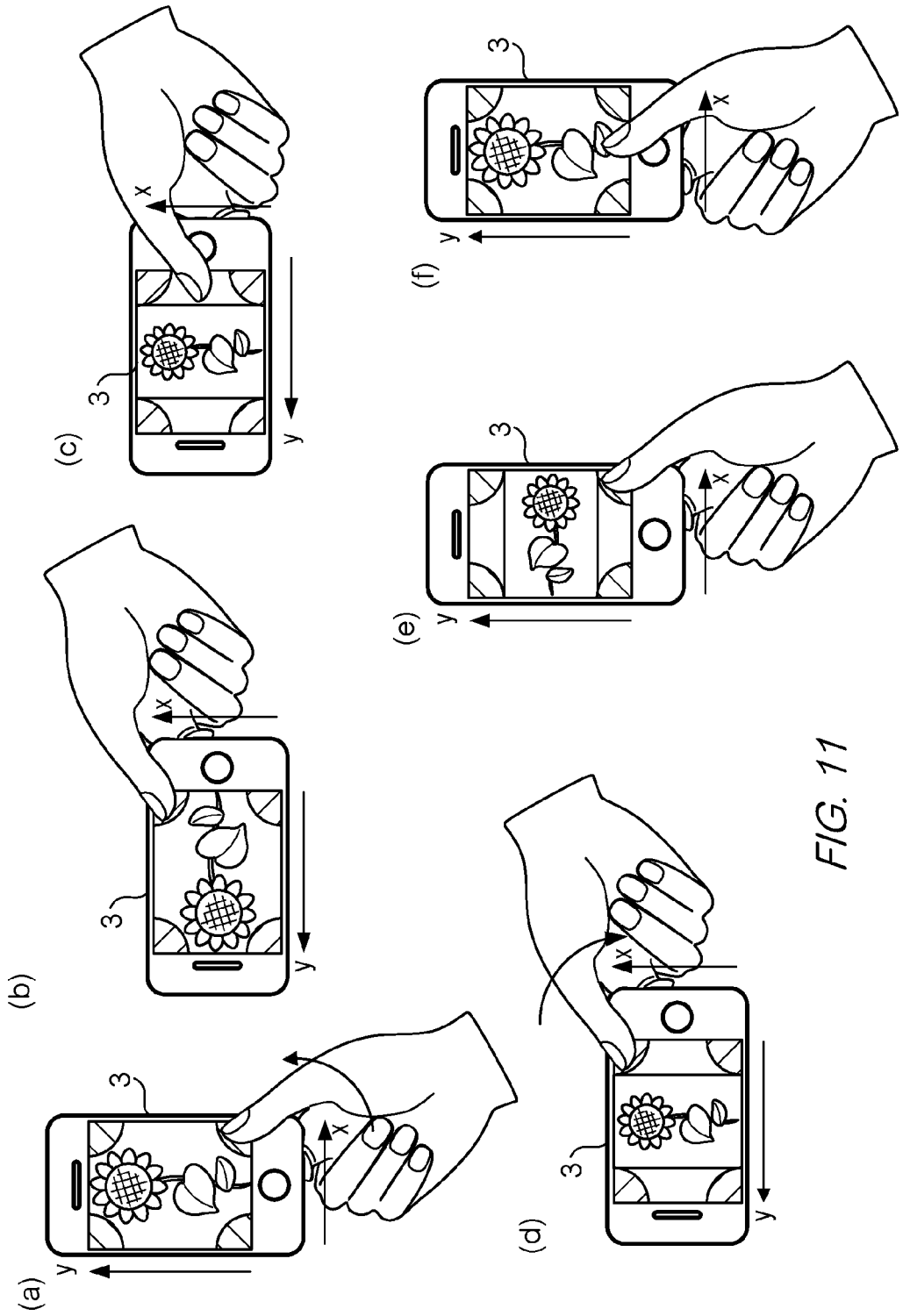
FIGS. 11(a)-11(f) show how an image is displayed by the mobile terminal device according to the third exemplary embodiment of the present invention.

FIG. 10 and FIG. 11 show how an image is displayed by mobile terminal device 3. FIG. 10 shows how a direction of an image displayed on mobile terminal device 3 is changed when a user touches the screen with his/her finger at a position outside of the predetermined area of the screen shown with hatched lines in FIG. 10 (namely, the area containing four sub-areas with a quarter sector shape located at corners of the screen). In this case, the display rotation function remains on, and a direction of the image is changed in response to a change of direction of mobile terminal device 3 so that the downward direction of the image extends in the vertical downward direction in the real world.

FIG. 11 shows how the direction of an image displayed by mobile terminal device 3 is changed when the user changes a direction of mobile terminal device 3 while touching the screen with his/her finger at different positions on the screen. FIG. 11(*a*) shows a situation where the user touches the screen at a position in the predetermined area. Because of the touch at the position in the predetermined area, the display rotation function is turned off. FIG. 11(*b*) shows a situation where the user rotates mobile terminal device 3 in an anticlockwise direction while touching the screen at the position in the predetermined area. In this situation, the direction of image on the screen is maintained as it is. FIG. 11(*c*) shows a situation where the user slides his/her finger to touch the screen at a position outside of the predetermined area. In this situation, the display rotation function is turned on, and the direction of an image on the screen is changed so that the downward direction of the image extends in the vertical downward direction in the real world.

FIG. 11(*d*) shows a situation where the user slides his/her finger to touch the screen at a position in the predetermined area following the situation shown by FIG. 11(*c*). In response to the change of touching position, the display rotation function is turned off, and the direction of an image on the screen is maintained as it is as shown in FIG. 11(*d*). FIG. 11(*e*) shows a situation where the user rotates mobile terminal device 3 in clockwise direction touching the screen at the position in the predetermined area. Namely, the direction of image on the screen is maintained as it is. FIG. 11(*f*) shows a situation where the user slides his/her finger to touch the screen at a position outside of the predetermined area. In the situation, the display rotation function is turned on, and the direction of an image is changed so that the downward direction of the image extends in the vertical downward direction in the real world.

As explained above, according to mobile terminal device 3, the user can turn off the display rotation function by touching the screen at a position in the predetermined area, and turn on by sliding the position where one or more of his/her fingers is in contact with the screen to a position outside of the predetermined area. The operation of touching the screen at a position in a predetermined position for maintaining the display rotation function turned off and the operation of sliding the touching position for turning on the display rotation function are intuitively understood by the user as virtual operations for fixing a paper on which an image is printed by pressing a drawing pin or adhesive tape at a position in the predetermined area such as an area containing sub areas around the corners.

A hardware configuration of mobile terminal device 3 that operates as explained above is the same as the hardware configuration of mobile terminal device 1 (FIG. 3), and a functional configuration of mobile terminal device 3 is the same as the functional configuration of mobile terminal device 1 (FIG. 4). However, control unit 104 of mobile terminal device 3 determines whether the display rotation function should be turned on or off on the basis whether a position of touch is in a predetermined area. Accordingly, touch detection unit 105 of mobile terminal device 3 determines, in addition to a touch, a position of the determined touch, and provides control unit 104 with the determined position. An area data set that indicates the predetermined area is stored in storage unit 102 of mobile terminal device 3 in advance.

Figure 12:
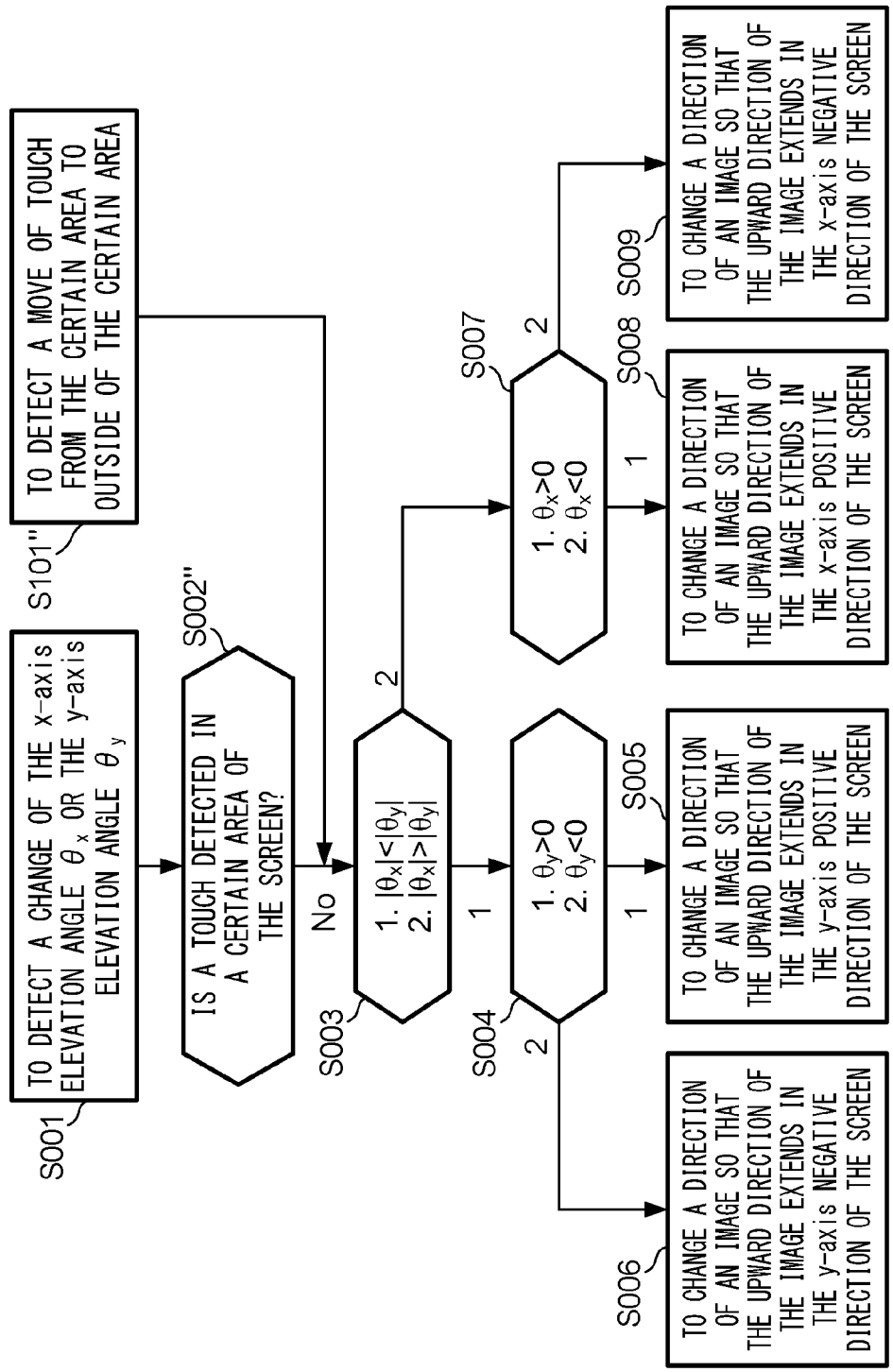
FIG. 12 shows a flow of processes executed by a control unit of the mobile terminal device according to the third exemplary embodiment of the present invention.

FIG. 12 shows a flow of processes that control unit 104 of mobile terminal device 3 executes for instructing display unit 103 directions in which an image should be displayed. The processes shown in FIG. 12 are the same as the processes executed by control unit 104 of mobile terminal device 1 as shown in FIG. 6 except that step S002 and step S101 are replaced by step S002" and step S101" explained below.

When control unit 104 detects a change of at least one of the x-axis elevation angle θx and the y-axis elevation angle θy (step S001), control unit 104 judges whether a touch at a position in the predetermined area indicated by the area data set stored in storage unit 102 is detected by touch detection unit 105 at the time (step S002").

When control unit 104 judges that a touch at a position in the predetermined area is detected by touch detection unit 105 in the judgment of step S002", control unit 104 does not instruct display unit 103 to change a direction of an image. A direction of an image on the screen is maintained as it is even if the user changes a direction of mobile terminal device 3 as long as the user touches the screen of mobile terminal device 3 at a position in the predetermined area.

On the other hand, when control unit 104 judges that a touch at a position in the predetermined area is not detected by touch detection unit 105 in the judgment of step S002" (step S002"; "No"), control unit 104 executes a series of processes of step S003 to step S009. As a result, when the user changes a direction of mobile terminal device 3 in a state where the user keeps touching the screen at a position in the predetermined area, a direction of an image on the screen is changed in response to the change of direction of mobile terminal device 3 so that the downward direction of the image extends in the vertical downward direction in the real world.

Moreover, control unit 104 monitors the position of touch determined by touch detection unit 105 When the position of touch determined by touch detection unit 105 moves from a position in the predetermined area to a position outside the predetermined area (step S101"), control unit 104 also executes a series of processes from step S003 to step S009 explained above. When the user slides a position where one or more of his/her fingers is in contact with the screen from a position in the predetermined area to a position outside of the predetermined area, a direction of an image on the screen is changed according to a direction of mobile terminal device 3 at a time such that the downward direction of the image extends in the vertical downward direction in the real world.

Display unit 103 displays an image by changing the direction of the image on the screen in accordance with instructions provided by control unit 104, as explained above. As a result, while one or more fingers of the user touch the screen at one or more positions in the predetermined area, the display rotation function is turned off, and a direction of the image on the screen at a time when one or more touch at one or more position in the predetermined area is detected is maintained. On the other hand, when one or more fingers of the user touch the screen at one or more positions outside the predetermined area or none of one or more of the user's fingers touches the screen, the display rotation function is turned on, and a direction of the image on the screen is changed in response to a change of direction of mobile terminal device 3 so that the downward direction of the image extends in the vertical downward direction in the real world.

[Fourth Exemplary Embodiment]

Mobile terminal device 4 according to a fourth exemplary embodiment of the present invention is explained below. Some parts of configuration of mobile terminal device 4 and processes executed by mobile terminal device 4 are the same as those of mobile terminal 1, and mainly parts of the configuration and processes of mobile terminal device 4 that are different from those of mobile terminal device 1 are explained below. In the following explanation, elements of mobile terminal device 4 in common with mobile terminal device 1 are denoted by like reference numerals.

According to mobile terminal device 1, the display rotation function is turned off while one or more fingers of the user touch the screen. Mobile terminal device 4 selectively operates in an unlock mode or in a lock mode. In the unlock mode, the display rotation function is turned off while one or more fingers of the user touch the screen. In the lock mode, the display rotation function is turned off regardless of whether the screen is touched by one or more fingers of the user. In the unlock mode, when the user touches the screen with one or more of his/her fingers with a strength greater than normal, the mode is switched from the unlock mode to the lock mode. In the lock mode, when a swipe operation, namely an operation of sliding one or more fingers on the screen, is made by the user in a predetermined area of the screen, the mode is switched from the lock mode to the unlock mode.

Figure 13A:
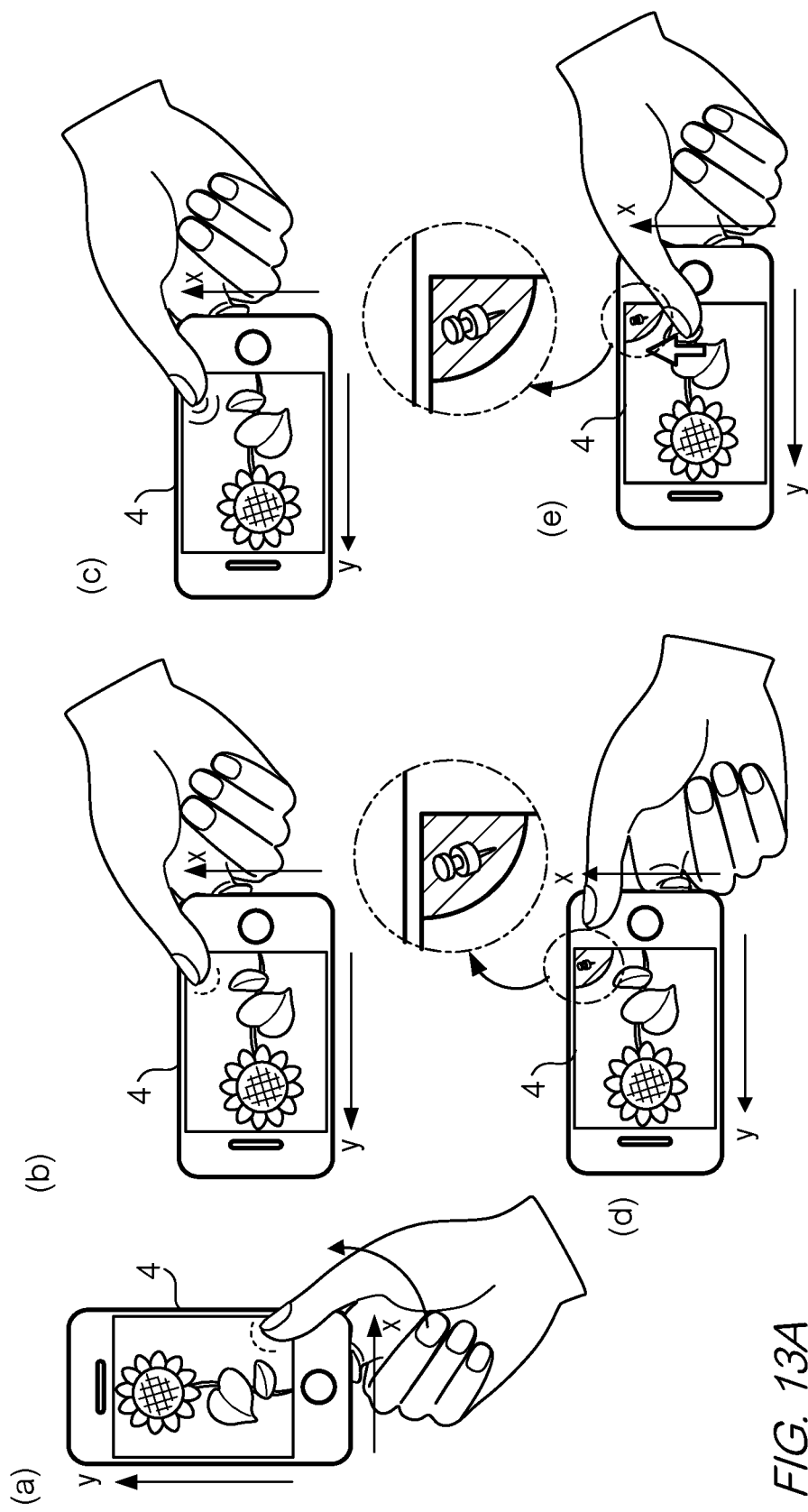
Figure 13B:
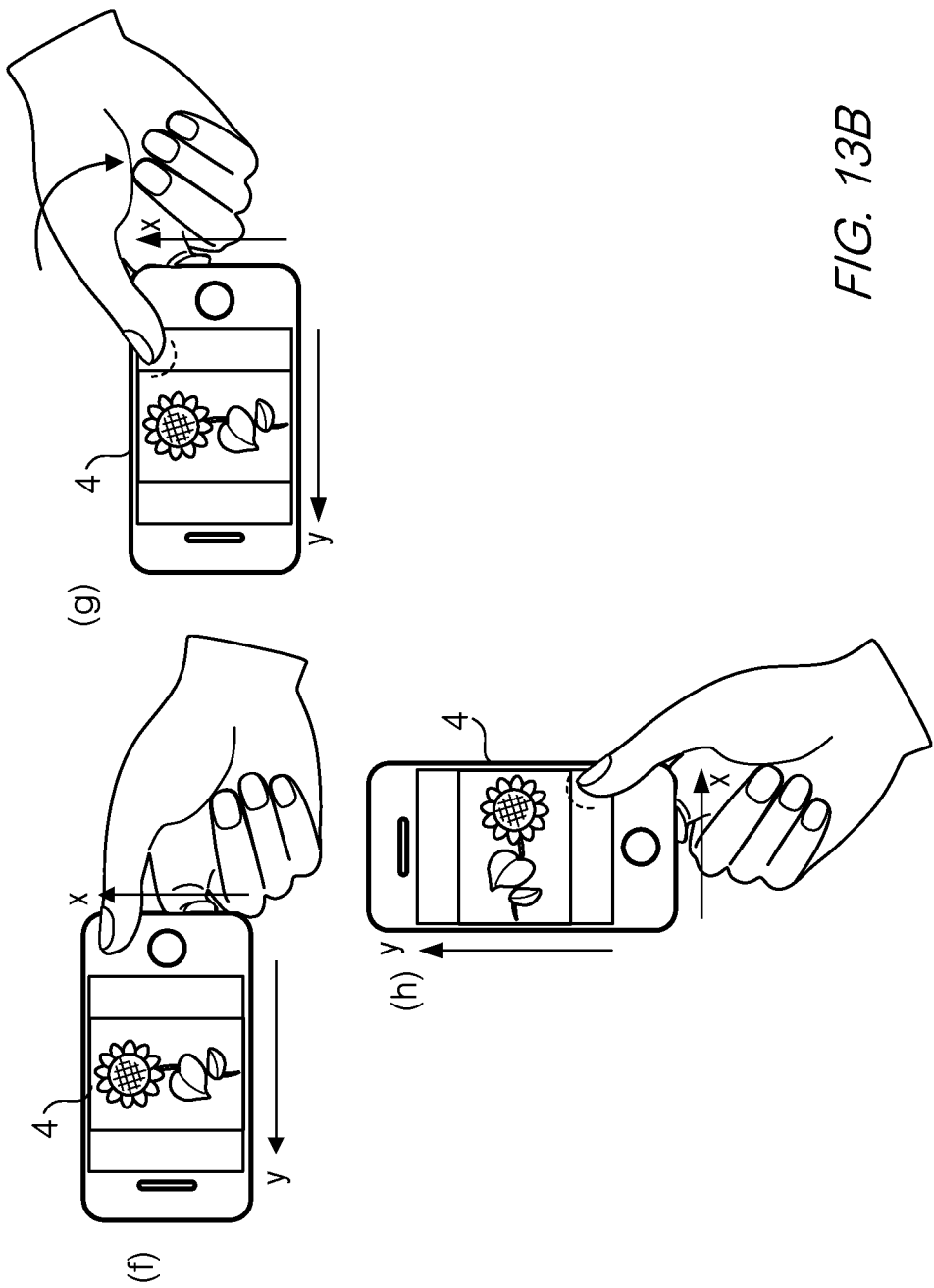

FIG. 13A and FIG. 13B show how an image is displayed by mobile terminal device 4. FIG. 13A(a) shows a situation where the user touches the screen with a normal strength in the unlock mode. In this situation, the display rotation function is turned off. FIG. 13A(b) shows a situation where the user rotates mobile terminal device 4 in an anticlockwise direction while touching the screen with a normal strength. In this situation, the direction of an image on the screen is maintained as it is.

FIG. 13A(c) shows a situation where the user touches the screen with a strength greater than normal. In response to the increased touch strength, mobile terminal device 4 switches from the unlock mode to the lock mode. FIG. 13A(d) shows a situation where mobile terminal device 4 operates in the lock mode. In the lock mode, the display rotation function is kept off, and even if the user stops touching the screen of mobile terminal device 4, a direction of an image on the screen is not changed. In the lock mode, an image of a drawing pin is displayed at a position on the screen where the user touches the screen strongly to instruct a switch to the lock mode.

FIG. 13A(e) shows a situation where the user makes a swipe operation in the area where the image of drawing pin is displayed. In response to the swipe operation, mobile terminal device 4 switches from the lock mode to the unlock mode. FIG. 13B(f) shows a situation where mobile terminal device 4 operates in the unlock mode and the screen is not touched by the user. In this situation, the display rotation function is kept on, and a direction of an image is changed in response to a change of direction of mobile terminal device 4 so that the downward direction of the image extends in the vertical downward direction in the real world at the time. When the mode is switched from the lock mode to the unlock mode, the image of drawing pin displayed in the lock mode disappears. Accordingly, the user can easily know whether the mobile terminal device 4 operates in the lock mode or in the unlock mode based on whether an image of drawing pin is displayed.

FIG. 13B(g) shows a situation where the user touches the screen with a normal strength in the unlock mode. In response to the normal touch, the display rotation function is turned off, and the direction of an image on the screen is maintained as it is. FIG. 13B(h) shows a situation where the user rotates mobile terminal device 4 in a clockwise direction while touching the screen following the situation shown in FIG. 13B(g). Namely, a direction of the image on the screen is maintained as it is.

As explained above, according to mobile terminal device 4, the user can instruct mobile terminal device 4 to switch mode from the unlock mode to the lock mode by touching the screen with a strength greater than normal, and instruct mobile terminal device 4 to switch mode from the lock mode to the unlock mode by making a swipe operation in the predetermined area. The operation of touching the screen strongly for locking the turned-off display rotation function, and the operation of sliding a touch in a predetermined area of the screen for unlocking the turned-off display rotation function are intuitively understood by the user as virtual operations equivalent to fixing a paper on which an image is printed by use of a drawing pin or adhesive tape, and releasing the paper by unfixing the drawing pin or the adhesive tape.

A hardware configuration of mobile terminal device 4 that operates as explained above is the same as the hardware configuration of mobile terminal device 1 (FIG. 3), and a functional configuration of mobile terminal device 4 is the same as the functional configuration of mobile terminal device 1 (FIG. 4). However, control unit 104 of mobile terminal device 4 determines whether mobile terminal device 4 should operate in the unlock mode or in the lock mode on the basis of whether a touch with a pressing force greater than a normal touch is detected, and whether a slide of touch in a predetermined area of the screen is detected. Accordingly, touch detection unit 105 of mobile terminal device 4 determines, in addition to a touch, an index value indicating a strength of a pressing force of a finger used for touching the screen and a position of the touch, and provides control unit 104 with the determined index value and the determined position of the touch.

An index value determined by touch detection unit 105 of mobile terminal device 4 that indicates a strength of pressing force is, for example, a dimension of a touch area in the same way as mobile terminal device 2 according to the second exemplary embodiment. Control unit 104 of mobile terminal device 4 determines whether a strength of user's touch of the screen is equal to or greater than a threshold strength based on whether a dimension of touch area determined by touch detection unit 105 is equal to or greater than a threshold value determined by multiplying a reference dimension, that is measured and stored in storage unit 102 in advance, by a predetermined coefficient (for example "1.2") in the same way as mobile terminal device 2. Moreover, storage unit 102 of mobile terminal device 4 stores a lock flag indicating the current mode, and control unit 104 of mobile terminal device 4 updates the lock flag on the basis of results of judgments explained below.

Figure 14:
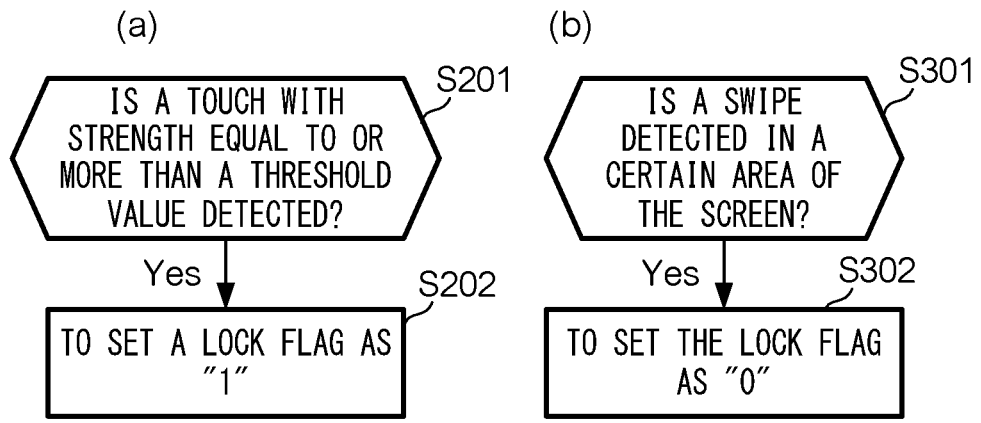
FIGS. 14(a) and 14(b) shows a flow of processes executed by a control unit of the mobile terminal device according to the fourth exemplary embodiment of the present invention.

FIG. 14 shows processes when control unit 104 updates the lock flag. FIG. 14(a) shows processes executed by control unit 104 when "0" (False) indicating the unlock mode is set to the lock flag. FIG. 14(b) shows processes executed by control unit 104 when "1" (True) indicating the lock mode is set to the lock flag.

While "0" is set to the lock flag, namely in the unlock mode, control unit 104 monitors the dimension of touch area determined by touch detection unit 105. When the dimension of touch area determined by touch detection unit 105 changes from a value less than the threshold value, that is calculated by multiplying the reference dimension by a predetermined coefficient, to a value equal to or greater than the threshold value, in other words, when the strength of touch of one or more fingers against the screen reaches the threshold strength (step S201; "Yes"), control unit 104 sets "1" to the lock flag (step S202). After this update of the lock flag, mobile terminal device 4 operates in the lock mode.

While "1" is set to the lock flag, namely in the lock mode, control unit 104 monitors the position of touch determined by touch detection unit 105. When the position of touch determined by touch detection unit 105 moves more than a predetermined distance in a predetermined area surrounding an image of drawing pin displayed in the lock mode, in other words, when the user's operation to swipe the image of drawing pin is detected (step S301; "Yes"), control unit 104 sets "0" to the lock flag (step S302). After this update of the lock flag, mobile terminal device 4 operates in the unlock mode.

While "0" is set to the lock flag, i.e. in the unlock mode, control unit 104 of mobile terminal device 4 operates in the same way as control unit 104 of mobile terminal device 1 and executes the series of processes shown in FIG. 6. Namely, while one or more fingers of the user is in contact with the screen, control unit 104 maintains the display rotation function turned off, and while none of one or more fingers of the user is in contact with the screen, control unit 104 maintains the display rotation function turned on. On the other hand, while "1" is set to the lock flag, i.e. in the lock mode, control unit 104 always maintains the display rotation function turned off. Accordingly, even if the user releases his/her touch of the screen, a direction of an image on the screen is maintained as it is.

As a result of the above explained processes executed by control unit 104, the user can lock the display rotation function turned off by pressing the screen more strongly than a normal touch, and release the lock by swiping an image of drawing pin indicating that the display rotation function is locked in a turned off state.

[Modifications]

The above explained embodiments are exemplary embodiments not limitative of the present invention, and the embodiments may be modified in several ways within the scope of the technical thought of the present invention. Some examples of such modifications are provided below.

In the above explained exemplary embodiments, a change of direction of image on the screen made in response to a change of direction of the mobile terminal device is made in a 90-degree unit. Namely, a direction of image is determined so that a vertical direction of image extends in the y-axis direction of the screen or the x-axis direction of the screen. A unit in which a direction of image is changed is not limited to a 90-degree unit, and a direction of image may be changed by any angle size such as an angle of 45 degrees, 10 degrees, 1 degree, etc. The smaller the size of an angle in which a direction of image is changed is, the more smoothly the image is rotated which imparts a sense of comfort to the user, although a processing load on the mobile terminal device increases.

In the above explained exemplary embodiments, an elapsed time of touch on the screen is not used for switching between on and off of the display rotation function, or for switching between the lock mode and the unlock mode (in the fourth exemplary embodiment). In a modified exemplary embodiment, the mobile terminal device may have a timer that measures an elapse time from a reference timing, and the elapse time may be used for switching between on and off of the display rotation function or for switching between the lock mode and the unlock mode. For example, the mobile terminal device may switch between on and off of the display rotation function or for switching between the lock mode and the unlock mode when an elapse time where a touch (or a touch meeting a certain condition, such as a touch with a pressing force equal to or greater than a threshold strength or a touch at a position in a predetermined area of the screen) is continuously detected or a touch (or a touch meeting a certain condition, such as a touch with a pressing force equal to or greater than a threshold strength or a touch at a position in a predetermined area of the screen) is continuously not detected exceeds a predetermined time period.

In the above explained exemplary embodiments, a number of fingers touched with the screen when the screen is held by the user is not used for switching between on and off of the display rotation function, or for switching between the lock mode and the unlock mode (in the fourth exemplary embodiment). In a modified exemplary embodiment, the touch sensor may detect a plural number of touches at the same time, and the mobile terminal device may switch between on and off of the display rotation function or for switching between the lock mode and the unlock mode when a number of detected touches (or touches meeting a certain condition, such as touches with a pressing force equal to or greater than a threshold strength or touches at positions in a predetermined area of the screen) is equal to or greater than a predetermined number. For example, if the mobile terminal device is configured to maintain the display rotation function turned off while the screen is touched with two or more fingers, the user can turn off the display rotation function by touching the screen with both of his/her thumbs of right and left hands at the same time. p The above explained third exemplary embodiment may be modified so that the user can specify the predetermined area where the user should touch the screen to turn off the display rotation function. In this modified embodiment, an area data set indicating an area of the screen specified by the user by touch operations, etc., is stored in the storage unit of the mobile terminal device, and the area data set is used for the judgment whether the display rotation function should be turned on or turned off.

The above explained third exemplary embodiment may be modified so that the predetermined area where the user should touch the screen to turn off the display rotation function is automatically changed by the mobile terminal device on the basis of information obtained by sensors of the mobile terminal device. For example, if the user makes operations to the mobile terminal device by his/her right hand, it is preferable that the area for touching is set in the right side of the screen, and if the user makes operations to the mobile terminal device by his/her left hand, it is preferable that the area for touching is set in the left side of the screen. Accordingly, if the mobile terminal device has a gyro sensor that determines angular velocity around a reference axis, the mobile terminal device may determine whether the user uses his/her right hand or left hand to make operations to the mobile terminal device on the basis of directions of movements of the mobile terminal device detected by the gyro sensor when the user touches the screen, etc., and the mobile terminal device may set the area for touching in the preferable area of the screen in accordance with the determined hand. The information that may be used for determining the position of the area for touching should not be limited to information obtained by a gyro sensor, and information obtained by various sorts of sensors such as an image sensor, a velocity sensor, geomagnetic sensor, or combination of two or more of the sensors, may be used for determining the position of the area for touching.

In the above explained fourth exemplary embodiment, the user can instructs the mobile terminal device to switch the mode from the lock mode to the unlock mode by swiping the screen in the area where a predetermined image is displayed. The way for the user to instruct the mobile terminal device to switch the mode should not be limited to this way. For example, the mobile terminal device may switch the mode from the lock mode to the unlock mode when the mobile terminal device detects a swipe operation made by the user at an arbitrary position on the screen. For example, the mobile terminal device may switch the mode from the lock mode to the unlock mode when the mobile terminal device detects a touch with a pressing force that is equal to or greater than a predetermined threshold strength at a position in an area where a predetermined image is displayed or at an arbitrary position in the screen.

In the above explained exemplary embodiments and modifications, a pointer touched with the screen is a finger of the user. Instead of a finger of the user, any other sort of pointer such as stylus may be used as a pointer. If the mobile terminal device has a touch sensor that detects a proximity of a pointer to the screen when a distance between the pointer and the screen becomes equal to or closer than a predetermined threshold value, the term "touch" used in the explanation of the exemplary embodiments and modifications may be replaced with the term "touch or proximity" as far as pressing force is not required for the processes executed by the mobile terminal device.

Two or greater of the above explained exemplary embodiments and modifications may be combined as far as they can be combined. For example, in a modification obtained by combining the second and third exemplary embodiments, the mobile terminal device may maintain the display rotation function turned off while the mobile terminal device keeps detecting a touch with a pressing force equal to or stronger than a predetermined strength in a predetermined area.

In the above explained exemplary embodiments, the mobile terminal device is realized by a versatile computer executing processing instructed by a program according to the present invention. Instead of this, the mobile terminal device according to the present invention may be realized as a dedicated device.

The programs executed by the mobile terminal device according to the above explained exemplary embodiments may be stored in the storage unit of the mobile terminal device in advance before the mobile terminal device is shipped, or the programs may be obtained by the mobile terminal device from other devices via a media such as a network containing Internet, a computer readable recording medium, etc., and store the obtained programs in the storing unit.

The program executed by the mobile terminal device according to each of the above explained exemplary embodiments may be configured as a part of an operation system (OS), as a part of an application program, etc. When the program executed by the mobile terminal device is configured as a part of an OS, any application program executed on the OS can use the above explained function that enables the user to turn on and off the display rotation function by easy operation. Accordingly, it is not required for each application program to contain codes for the function that enables the user to turn on and off the display rotation function by easy operation.

In the above explanation of the exemplary embodiments, it is not mentioned whether an image displayed on the screen is a still image or a moving image. The mobile terminal device according to the present invention may display either a still image or a moving image.

As explained in the prior part, an "image" in this application may contain any sort of information such as figures, texts, symbols, and so on. Accordingly, an image displayed by the mobile terminal device according to the present invention may be any sort of image such as a photo, a screen of Web browser, a screen displaying texts, a screen of game, etc., and an application program instructing a display unit to display the image may be any sort of application.

In each of the above explained exemplary embodiments, in a situation where the display rotation function is turned off or turned on in response to a simple operation made by the user to the mobile terminal device such as a touch (or a touch meeting a certain condition, such as a touch with a pressing force equal to or greater than a threshold strength or a touch at a position in a predetermined area of the screen), when an operation such as a touch with the screen, the mobile terminal device may execute a process in accordance with the operation maintaining a direction of image on the screen at the time. Some examples of behaviors of the mobile terminal device in such a situation are explained below.

Figure 15:
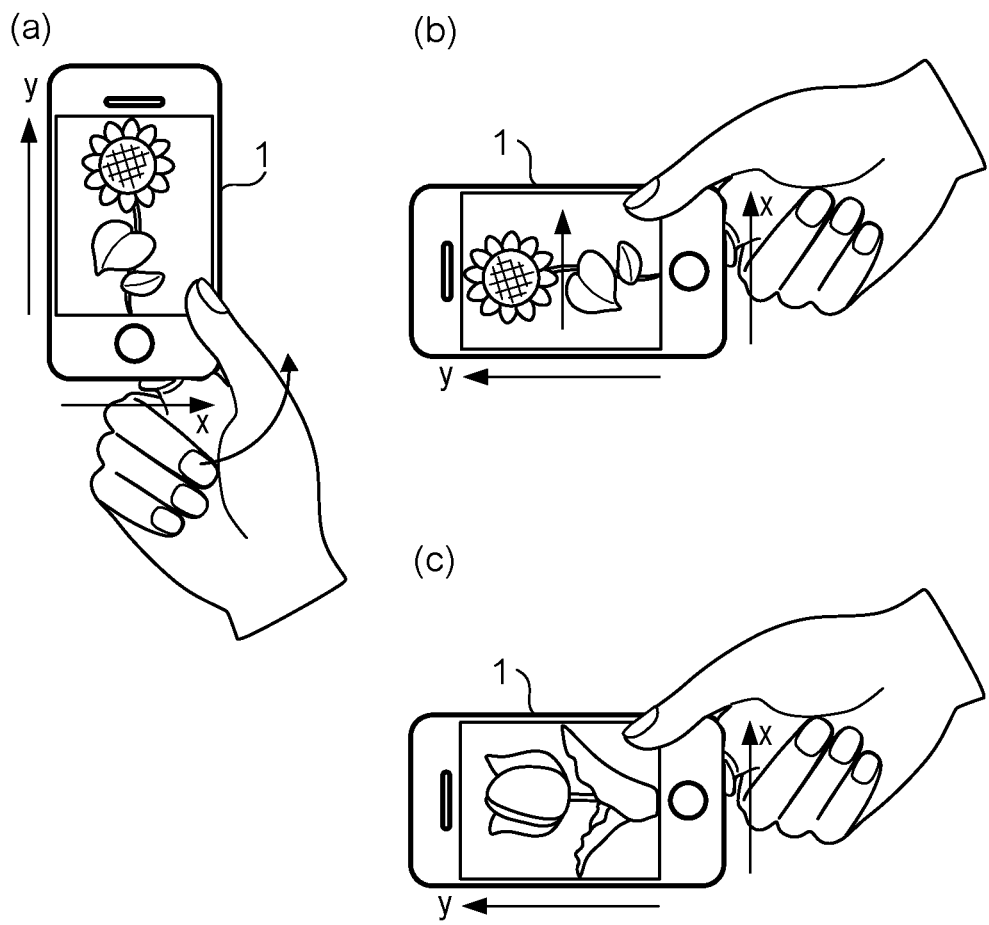
FIG. 15(a)-15(c) show how an image is displayed by a mobile terminal device according to an exemplary embodiment of the present invention.

FIG. 15(a)-(c) shows how images are displayed by mobile terminal device 1 of the first exemplary embodiment when the user makes a flick operation on the screen of mobile terminal device 1 in a situation where the display rotation function is turned off in response to a touch operation made by the user. As shown in FIG. 15(b) and FIG. 15(c), when a flick operation is made by the user in a situation where the display rotation function is turned off by a touch operation by the user as shown in FIG. 15(a), mobile terminal device 1, for example, switches images displayed on the screen (or turn the pages) maintaining the directions of images on the screen.

Figure 16:
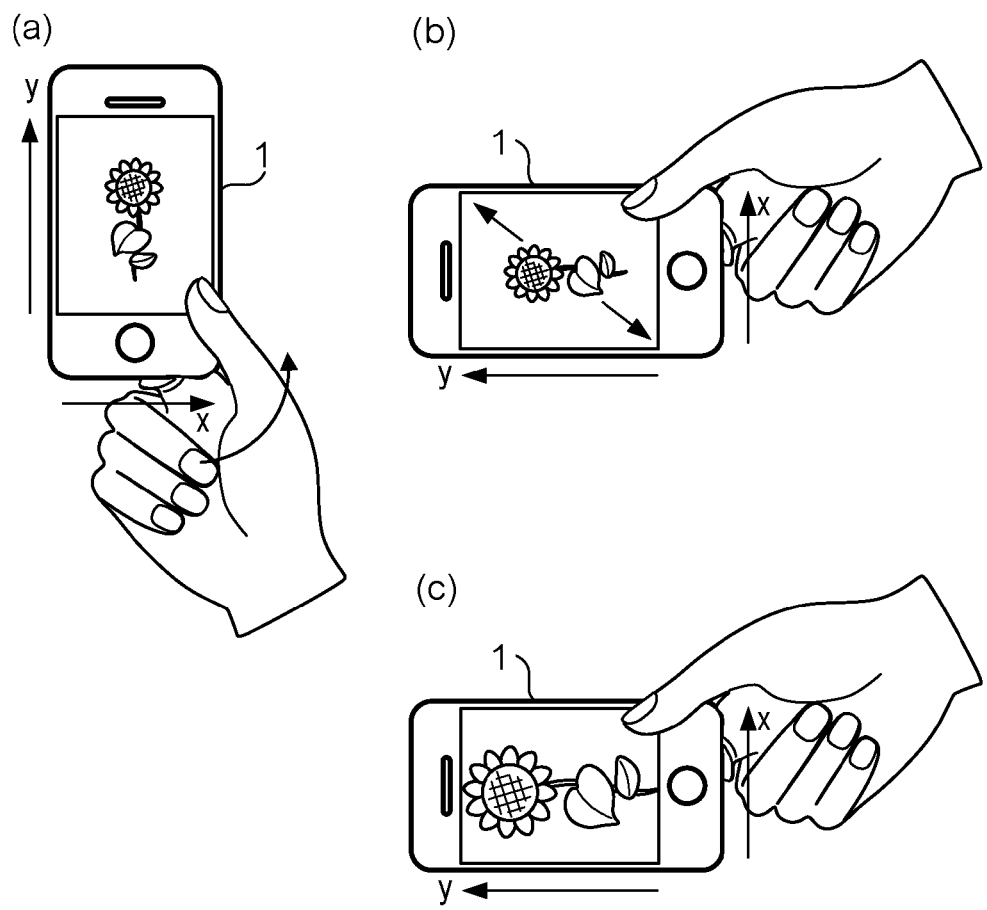
FIG. 16(a)-16(c) show how an image is displayed by a mobile terminal device according to an exemplary embodiment of the present invention.

FIG. 16(a)-(c) shows how an image is displayed by mobile terminal device 1 of the first exemplary embodiment when the user makes a pinch operation on the screen of mobile terminal device 1 in a situation where the display rotation function is turned off in response to a touch operation made by the user. As shown in FIG. 16(b) and FIG. 16(c), when a pinch operation is made by the user in a situation where the display rotation function is turned off by a touch operation by the user as shown in FIG. 16(a), mobile terminal device 1, for example, displays an enlarged image (when a pinch out operation is made) or a reduced image (when a pinch in operation is made) maintaining the direction of image on the screen.

Figure 17:
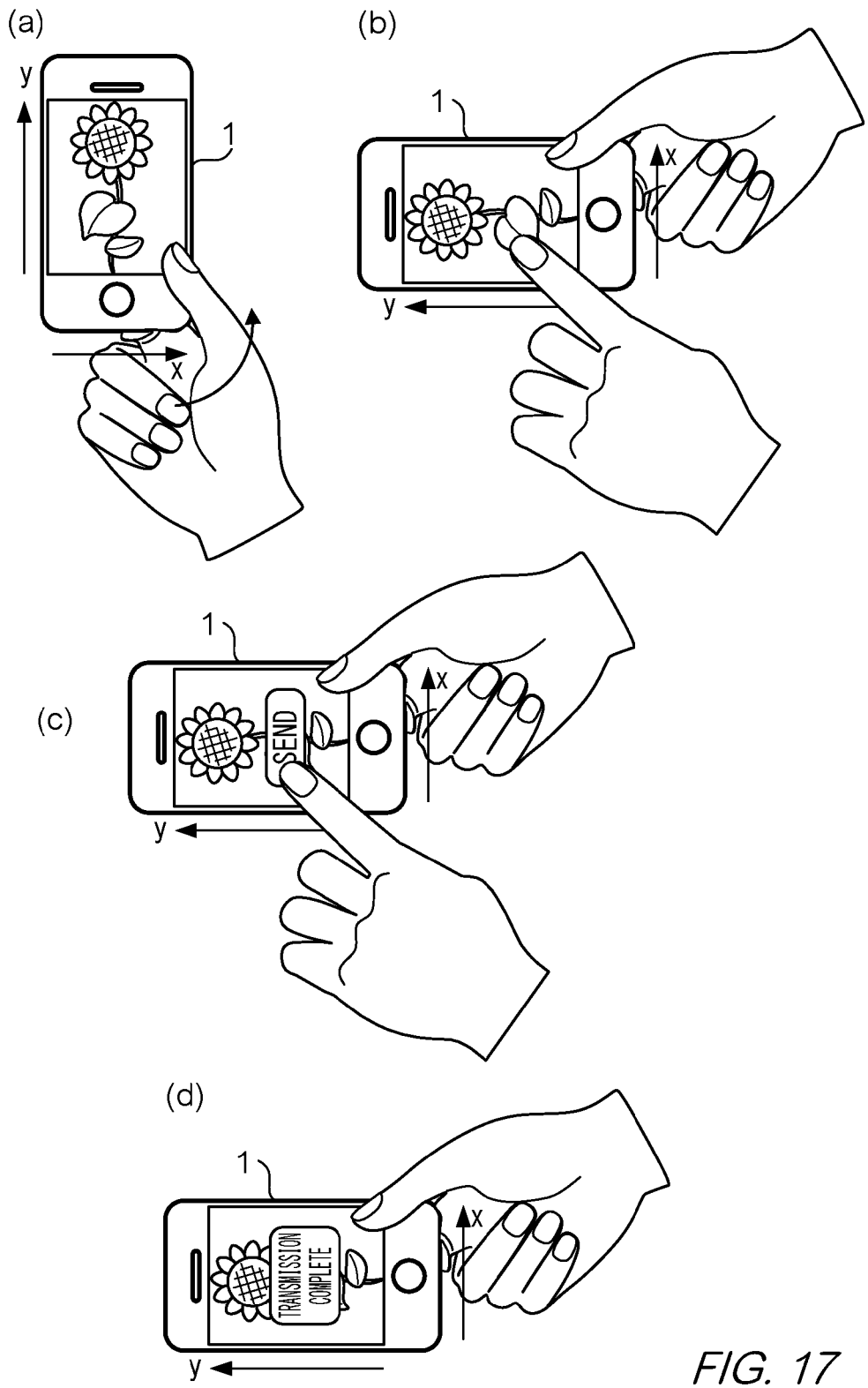
FIG. 17(a)-17(d) show how an image is displayed by a mobile terminal device according to an exemplary embodiment of the present invention.

FIG. 17(a)-(d) shows how an image is displayed by mobile terminal device 1 of the first exemplary embodiment when the user makes a tap operation on the screen of mobile terminal device 1 in a situation where the display rotation function is turned off in response to a touch operation made by the user. As shown in FIG. 17(b), FIG. 17(c) and FIG. 16(d), when a tap operation is made by the user in a situation where the display rotation function is turned off by a touch operation by the user as shown in FIG. 17(a), mobile terminal device 1 executes a process (or a series of processes) in accordance with the tap operation such as sending a displayed image to a predetermined address (for example, a certain storage space in a cloud).

What is claimed is:

1. A device comprising:
a display unit that displays an image on a screen,
a touch detection unit that detects a touch of a finger on the screen, and when a touch of a finger is detected, determines an index value indicating a level of pressing force of the detected touch with the screen,
an inclination detection unit that detects an inclination of the screen from a reference direction, and
a control unit that instructs the display unit to change a direction of the image on the screen,
wherein
in a first mode, the control unit determines whether a direction of the image on the screen should be changed in response to a detection of an inclination of the screen by the inclination detection unit on the basis of whether a touch of a finger is currently detected by the touch detection unit, and instructs the display unit to change a direction of the image when the control unit determines that a finger is not currently detected by the touch detection unit and a direction of the image on the screen should be changed,
in a second mode, the control unit does not instruct the display unit to change a direction of the image on the screen regardless of a detection of an inclination of the screen by the inclination detection unit,
while the control unit is in the first mode, when a touch is currently detected by the touch detection unit and a level of pressing force indicated by the touch detection unit is equal to or greater than a second level of pressing force that is stronger than a strength of a first level of pressing force used by a user to touch the screen, the control unit switches to the second mode, after the control unit switches to the second mode, the second mode is maintained even if a level of pressing force indicated by the touch detection unit becomes lower than the second level, and while the control unit is in the second mode, when the control unit determines a moving position of a touch indicating a slide of a finger in a predetermined area on the screen, the control unit switches to the first mode.

2. A control unit of a computer comprising a display unit that displays an image on a screen; a touch detection unit that detects a touch of a finger on the screen, and when a touch of a finger is detected, determines an index value indicating a level of pressing force of the detected touch with the screen; and an inclination detection unit that detects an inclination of the screen from a reference direction; the control unit configured to execute:

in a first mode, determining whether a direction of the image on the screen should be changed in response to a detection of an inclination of the screen by the inclination detection unit on the basis of whether a touch of a finger is currently detected by the touch detection unit, and instructs the display unit to change a direction of the image when the control unit determines that a finger is not currently detected by the touch detection unit and a direction of the image on the screen should be changed, in a second mode, preventing the display unit from changing a direction of the image on the screen regardless of a detection of an inclination of the screen by the inclination detection unit, in the first mode, when a touch is currently detected by the touch detection unit and a level of pressing force indicated by the touch detection unit is equal to or greater than a second level of pressing force that is stronger than a strength of a first level of pressing force used by a user to touch the screen, switches to the second mode, after switching to the second mode, maintains the second mode even if a level of pressing force indicated by the touch detection unit becomes lower than the second level, and in the second mode, when a moving position of a touch indicates a slide of a finger in a predetermined area on the screen, switches to the first mode.

* * * * *